(12) United States Patent
Russo et al.

(10) Patent No.: US 12,736,817 B2
(45) Date of Patent: Sep. 15, 2026

(54) AUGMENTED REALITY WAVEGUIDES WITH DYNAMICALLY ADDRESSABLE DIFFRACTIVE OPTICAL ELEMENTS

(71) Applicant: Snap Inc., Santa Monica, CA (US)

(72) Inventors: Juan Russo, Denver, CO (US); Adam Douglas Greengard, Lafayette, CO (US)

(73) Assignee: Snap Inc., Santa Monica, CA (US)

( * ) Notice: Subject to any disclaimer, the term of this patent is extended or adjusted under 35 U.S.C. 154(b) by 551 days.

(21) Appl. No.: 18/305,953

(22) Filed: Apr. 24, 2023

(65) Prior Publication Data

US 2023/0418071 A1 Dec. 28, 2023

Related U.S. Application Data

(60) Provisional application No. 63/354,821, filed on Jun. 23, 2022.

(51) Int. Cl.
*G02B 27/01* (2006.01)
*F21V 8/00* (2006.01)

(52) U.S. Cl.
CPC ....... *G02B 27/0172* (2013.01); *G02B 6/0016* (2013.01); *G02B 6/0035* (2013.01);
(Continued)

(58) Field of Classification Search
CPC .............. G02B 27/0172; G02B 27/017; G02B 27/0179; G02B 2027/0178; G02B 2027/0112; G02B 2027/0187; G02B 6/0016; G02B 6/0018; G02B 6/0035; G02B 6/0065
See application file for complete search history.

(56) References Cited

U.S. PATENT DOCUMENTS 1,089,539 A 3/1914 Driver
1,683,505 A 9/1928 Stewart
(Continued)

FOREIGN PATENT DOCUMENTS

CN 101446684 B 4/2011
CN 105589200 5/2016
(Continued)

OTHER PUBLICATIONS

"U.S. Appl. No. 16/619,888, Final Office Action mailed Mar. 3, 2022", 21 pgs.

(Continued)

*Primary Examiner* — Thomas A Hollweg
*Assistant Examiner* — Mary A El-Shammaa
(74) *Attorney, Agent, or Firm* — Schwegman Lundberg & Woessner, P.A.

(57) ABSTRACT

A waveguide includes a waveguide body including an optically transmissive material having a refractive index different from a surrounding medium and defining an output surface. The waveguide body is configured to propagate light by total internal reflection in one or more directions substantially tangential to the output surface. The waveguide includes one or more diffractive optical elements (DOEs), each configured to change its diffraction efficiency in response to a respective stimulus, and a DOE driver configured to provide the stimuli to each of the DOEs independently.

19 Claims, 13 Drawing Sheets

(52) U.S. Cl.
CPC ........ *G02B 27/0179* (2013.01); *G02B 6/0065* (2013.01); *G02B 2027/0112* (2013.01); *G02B 2027/0178* (2013.01); *G02B 2027/0187* (2013.01)

(56) References Cited

U.S. PATENT DOCUMENTS

| | | | | |
|---|---|---|---|---|
| 2,114,658 | A | 4/1938 | Noffsinger | |
| 2,232,455 | A | 2/1941 | Leon | |
| 2,824,308 | A | 2/1958 | Duncan | |
| 3,756,703 | A | 9/1973 | Nelson | |
| 4,711,512 | A | 12/1987 | Upatnieks | |
| 4,764,011 | A | 8/1988 | Goldstein | |
| 4,869,584 | A | 9/1989 | Dion | |
| 4,953,231 | A | 9/1990 | Burnett | |
| 5,016,950 | A | 5/1991 | Smith | |
| 5,596,451 | A | 1/1997 | Handschy et al. | |
| 5,884,991 | A | 3/1999 | Levis et al. | |
| 6,256,151 | B1 | 7/2001 | Ma et al. | |
| 9,644,816 | B1 | 5/2017 | Barnidge et al. | |
| 9,733,475 | B1 | 8/2017 | Brown et al. | |
| 11,513,351 | B2 | 11/2022 | Woods | |
| 2002/0101664 | A1 | 8/2002 | King et al. | |
| 2008/0247048 | A1 | 10/2008 | Francois et al. | |
| 2010/0002154 | A1 | 1/2010 | Hua | |
| 2013/0169894 | A1 | 7/2013 | Ouderkirk et al. | |
| 2014/0168260 | A1 | 6/2014 | O'brien et al. | |
| 2014/0211322 | A1 | 7/2014 | Bohn et al. | |
| 2015/0098029 | A1 | 4/2015 | Sato et al. | |
| 2015/0177591 | A1* | 6/2015 | Sugiyama | G02B 27/0093 359/298 |
| 2016/0041390 | A1 | 2/2016 | Poon et al. | |
| 2016/0077338 | A1 | 3/2016 | Robbins et al. | |
| 2016/0116742 | A1 | 4/2016 | Wei | |
| 2017/0139210 | A1 | 5/2017 | Vallius | |
| 2017/0227764 | A1 | 8/2017 | Kim et al. | |
| 2017/0242264 | A1 | 8/2017 | Sissom | |
| 2017/0315356 | A1 | 11/2017 | Tervo | |
| 2018/0113313 | A1 | 4/2018 | Tekolste et al. | |
| 2018/0324402 | A1* | 11/2018 | Lowney | G02B 6/00 |
| 2018/0376124 | A1 | 12/2018 | Zhou | |
| 2019/0064526 | A1 | 2/2019 | Connor | |
| 2019/0346600 | A1 | 11/2019 | Wheatley et al. | |
| 2020/0103650 | A1 | 4/2020 | Woods | |
| 2020/0341281 | A1 | 10/2020 | Woods | |
| 2021/0223549 | A1 | 7/2021 | Maimone et al. | |
| 2022/0244679 | A1 | 8/2022 | Volkov et al. | |
| 2023/0324697 | A1 | 10/2023 | Woods | |
| 2023/0418066 | A1 | 12/2023 | Russo | |

FOREIGN PATENT DOCUMENTS

| | | | | |
|---|---|---|---|---|
| CN | 103309035 | B | 12/2016 | |
| CN | 107209445 | | 9/2017 | |
| CN | 111630417 | | 9/2020 | |
| EP | 0584802 | | 3/1994 | |
| EP | 1069451 | A2 | 1/2001 | |
| EP | 3740794 | | 11/2020 | |
| GB | 2570302 | | 7/2019 | |
| TW | 201510572 | | 3/2015 | |
| TW | 201940926 | A | 10/2019 | |
| WO | 2010057272 | | 5/2010 | |
| WO | WO-2013033274 | A1 | 3/2013 | |
| WO | 2013128615 | | 9/2013 | |
| WO | WO-2016132584 | A1 | 8/2016 | |
| WO | 2018224802 | | 12/2018 | |
| WO | 2019141967 | | 7/2019 | |
| WO | WO-2021016045 | A1 * | 1/2021 | G02B 27/0172 |
| WO | WO-2023249844 | A8 | 10/2024 | |

OTHER PUBLICATIONS

"U.S. Appl. No. 16/619,888, Final Office Action mailed Nov. 17, 2021", 20 pgs.

"International Application Serial No. PCT/GB2018/051406, International Search Report mailed Sep. 20, 2018", 3 pgs.

"International Application Serial No. PCT/GB2018/051406, Written Opinion mailed Sep. 20, 2018", 7 pgs.

"International Application Serial No. PCT/GB2018/051406, International Preliminary Report on Patentability mailed Dec. 19, 2019", 9 pgs.

"U.S. Appl. No. 16/619,888, Preliminary Amendment filed Dec. 5, 2019", 6 pgs.

"U.S. Appl. No. 16/619,888, Non Final Office Action mailed Aug. 24, 2020", 12 pgs.

"U.S. Appl. No. 16/619,888, Response filed Nov. 23, 2020 to Non Final Office Action mailed Aug. 24, 2020", 9 pgs.

"U.S. Appl. No. 16/619,888, Final Office Action mailed Jan. 28, 2021", 17 pgs.

"U.S. Appl. No. 16/619,888, Examiner Interview Summary mailed Apr. 20, 2021", 3 pgs.

"U.S. Appl. No. 16/619,888, Response filed Apr. 27, 2021 to Final Office Action mailed Jan. 28, 2021", 9 pgs.

"U.S. Appl. No. 16/619,888, Non Final Office Action mailed May 14, 2021", 17 pgs.

"U.S. Appl. No. 16/619,888, Response filed Aug. 12, 2021 to Non Final Office Action mailed May 14, 2021", 10 pgs.

"U.S. Appl. No. 16/619,888, Response filed Feb. 17, 2022 to Final Office Action mailed Nov. 17, 2021", 11 pgs.

"U.S. Appl. No. 16/960,311, Non Final Office Action mailed Mar. 16, 2022", 9 pgs.

"Chinese Application Serial No. 201980009073.8, Office Action mailed Mar. 10, 2022", w/ English translation, 21 pgs.

"U.S. Appl. No. 16/619,888, Examiner Interview Summary mailed Apr. 26, 2022", 3 pgs.

"U.S. Appl. No. 16/619,888, Response filed May 3, 2022 to Final Office Action mailed Mar. 3, 2022", 11 pgs.

"U.S. Appl. No. 16/619,888, Advisory Action mailed May 17, 2022", 4 pgs.

"U.S. Appl. No. 16/960,311, Response filed Jun. 7, 2022 to Non Final Office Action mailed Mar. 16, 2022", 12 pgs.

"U.S. Appl. No. 16/960,311, Final Office Action mailed Jun. 22, 2022", 12 pgs.

"U.S. Appl. No. 16/619,888, Response filed Jun. 30, 2022 to Advisory Action mailed May 17, 2022", 12 pgs.

"International Application Serial No. PCT/GB2019/050031, International Search Report mailed Apr. 9, 2019", 3 pgs.

"International Application Serial No. PCT/GB2019/050031, Written Opinion mailed Apr. 9, 2019", 9 pgs.

"International Application Serial No. PCT/GB2019/050031, International Preliminary Report on Patentability mailed Apr. 17, 2020", 6 pgs.

"U.S. Appl. No. 16/619,888, Notice of Allowance mailed Jul. 27, 2022", 15 pgs.

"U.S. Appl. No. 16/960,311, Preliminary Amendment filed Jul. 6, 2020", 6 pgs.

"U.S. Appl. No. 16/960,311, Response filed Aug. 22, 2022 to Final Office Action mailed Jun. 22, 2022", 10 pgs.

"U.S. Appl. No. 16/960,311, Examiner Interview Summary mailed Sep. 1, 2022", 2 pgs.

"U.S. Appl. No. 16/960,311, Non Final Office Action mailed Oct. 5, 2022", 17 pgs.

"Chinese Application Serial No. 201980009073.8, Office Action mailed Aug. 19, 2021", w/ English translation, 18 pgs.

"Chinese Application Serial No. 201980009073.8, Office Action mailed Jul. 5, 2022", w/ English translation, 17 pgs.

"U.S. Appl. No. 16/960,311, Examiner Interview Summary mailed Dec. 16, 2022", 2 pgs.

"United Kingdom Application Serial No. GB1800762.5, Search Report under Section 17(5) mailed Jul. 23, 2018", 3 pgs.

"U.S. Appl. No. 16/960,311, Response filed Jan. 4, 2023 to Non Final Office Action mailed Oct. 5, 2022", 8 pgs.

"Chinese Application Serial No. 201980009073.8, Office Action mailed Nov. 17, 2022", w/ English Translation, 14 pgs.

"U.S. Appl. No. 16/960,311, Notice of Allowance mailed Mar. 20, 2023", 12 pgs.

(56) References Cited

OTHER PUBLICATIONS

"U.S. Appl. No. 16/960,311, 312 Amendment filed Jun. 12, 2023", 6 pgs.
"U.S. Appl. No. 16/960,311, PTO Response to Rule 312 Communication mailed Jul. 17, 2023", 3 pgs.
"U.S. Appl. No. 18/334,137, Non Final Office Action mailed Jan. 31, 2025", 13 pgs.
"U.S. Appl. No. 18/334,137, Non Final Office Action mailed Apr. 11, 2025", 16 pgs.
"U.S. Appl. No. 18/334,137, Non Final Office Action mailed Aug. 14, 2024", 11 pgs.
"U.S. Appl. No. 18/334,137, Response filed Nov. 14, 2023 to Non Final Office Action mailed Aug. 14, 2024", 7 pgs.
"U.S. Appl. No. 18/334,137, Response Filed Nov. 14, 2024 to Non Final Office Action Mailed Aug. 14, 2024", 7 pgs.
"Chinese Application Serial No. 201980009073.8, Decision of Rejection mailed Nov. 17, 2022", 7 pgs.
"Chinese Application Serial No. 202380048678.4, Voluntary Amendment filed Apr. 24, 2025", w/ English Claims, 9 pgs.
"European Application Serial No. 19700438.5, Response to Communication pursuant to Rules 161(2) and 162 EPC filed Jan. 22, 2021", 21 pgs.
"International Application Serial No. PCT/GB2019/050031, Response to Written Opinion and Article 34 Amendments filed Aug. 14, 2019", 5 pgs.
"International Application Serial No. PCT/US2023/025222, International Preliminary Report on Patentability mailed Jan. 2, 2025", 8 pgs.
"International Application Serial No. PCT/US2023/025222, International Search Report mailed Oct. 9, 2023", 3 pgs.
"International Application Serial No. PCT/US2023/025222, Written Opinion mailed Oct. 9, 2023", 6 pgs.
"Taiwanese Application Serial No. 108101766, Office Action mailed Dec. 4, 2019", w/ English machine translation, 11 pgs.
"United Kingdom Application Serial No. 1714414.8, Search Report under Section 17(5) mailed Feb. 27, 2018", 4 pgs.
"U.S. Appl. No. 18/334,137, Examiner Interview Summary mailed Jul. 16, 2025", 2 pgs.
"U.S. Appl. No. 18/334,137, Final Office Action mailed Sep. 24, 2025", 17 pgs.
"U.S. Appl. No. 18/334,137, Notice of Allowance mailed Jan. 22, 2026", 11 pgs.
"U.S. Appl. No. 18/334,137, Response filed Jul. 11, 2025 to Non Final Office Action mailed Apr. 11, 2025", 11 pgs.
"U.S. Appl. No. 18/334,137, Response filed Nov. 11, 2025 to Final Office Action mailed Sep. 24, 2025", 19 pgs.
"European Application Serial No. 23739732.8, Response to Communication pursuant to Rules 161 and 162 EPC filed Jul. 28, 2025", 11 pgs.
"European Application Serial No. 23739732.8, Communication pursuant to Article 943 EPC mailed Apr. 13, 2026", 5 pgs.

* cited by examiner 300
324
306
312
322
304
310
320
302
308
318
316
326
134
142
102
132
314

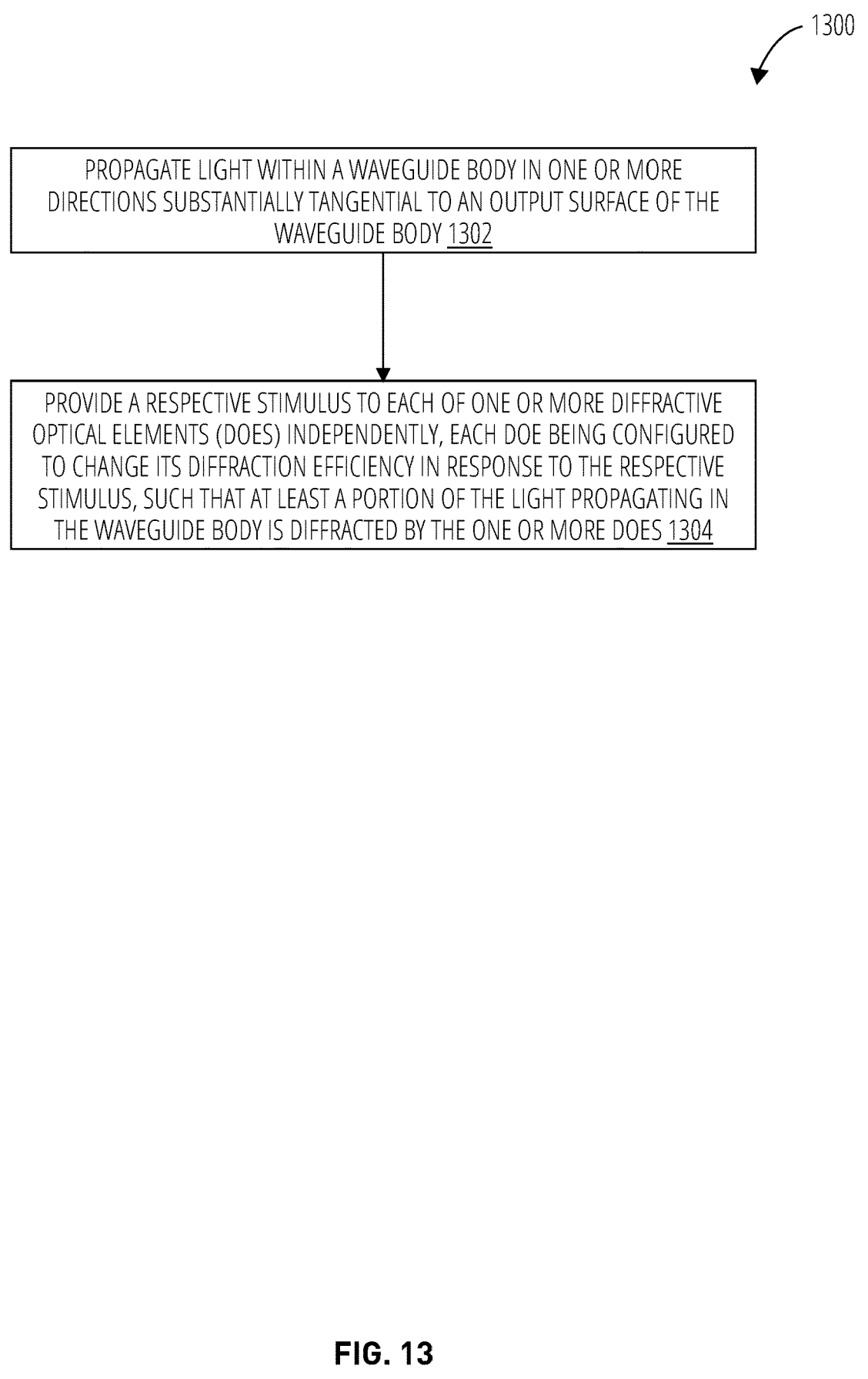

1300

PROPAGATE LIGHT WITHIN A WAVEGUIDE BODY IN ONE OR MORE DIRECTIONS SUBSTANTIALLY TANGENTIAL TO AN OUTPUT SURFACE OF THE WAVEGUIDE BODY 1302

PROVIDE A RESPECTIVE STIMULUS TO EACH OF ONE OR MORE DIFFRACTIVE OPTICAL ELEMENTS (DOES) INDEPENDENTLY, EACH DOE BEING CONFIGURED TO CHANGE ITS DIFFRACTION EFFICIENCY IN RESPONSE TO THE RESPECTIVE STIMULUS, SUCH THAT AT LEAST A PORTION OF THE LIGHT PROPAGATING IN THE WAVEGUIDE BODY IS DIFFRACTED BY THE ONE OR MORE DOES 1304

FIG. 13

AUGMENTED REALITY WAVEGUIDES WITH DYNAMICALLY ADDRESSABLE DIFFRACTIVE OPTICAL ELEMENTS

CLAIM OF PRIORITY

This application claims the benefit of priority to U.S. Provisional Application Ser. No. 63/354,821, filed on Jun. 23, 2022, which is incorporated herein by reference in its entirety.

TECHNICAL FIELD

The present disclosure relates generally to optical structures and more particularly to waveguides having input and output diffractive optical elements, such as diffraction gratings.

BACKGROUND

Diffractive optical elements (DOE), such as diffraction gratings, operate by diffracting light and are utilized to control the intensity and direction of light as the light interacts with the DOEs, which are structures sized on the order of the wavelength of light of interest. A typical augmented reality (AR) device includes a waveguide having an input coupler (IC) and output coupler (OC) formed on the waveguide, each of which is a DOE. A light source, such as a projector or micro display, transmits light onto the IC, which diffracts this light at an angle within the waveguide so that the light propagates within the waveguide through total internal reflection (TIR). When this light propagating in the waveguide is incident on the output coupler (OC), the light is diffracted out of the waveguide and towards an eye of a viewer or user of the AR device.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which:

FIG. 13 illustrates a method, according to some examples.

DETAILED DESCRIPTION

Figure 1:
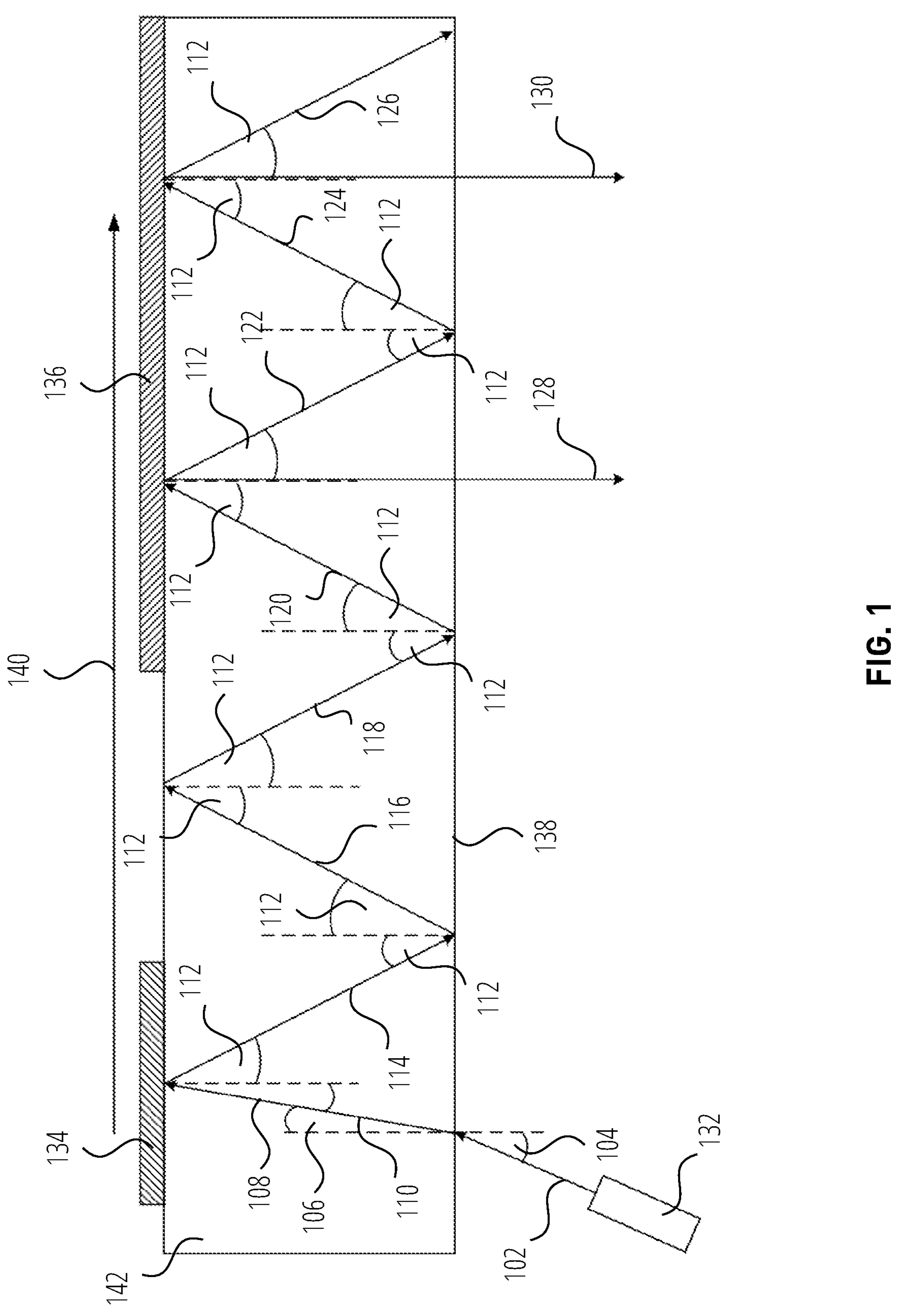
FIG. 1 illustrates a cross-sectional view of light entering and reflecting within a waveguide having an input DOE and an output DOE, according to some examples.

Examples are described herein that provide a waveguide having DOEs with dynamically adjustable diffraction efficiency profiles. The dynamically addressable DOEs (also called "adjustable DOEs" herein) can be used to implement dynamically controllable waveguides for use in various light-projection or light-redirection systems, such as AR display systems. In various examples, the adjustable DOEs can be used as spatial modulators, color selectors, or both.

The position of a user's eye may vary, and thus an AR device that creates, via the OC, a single image in a specific place would have limited utility. The user's eye would have to be precisely at the required location or risk not seeing the image formed by the light from the OC. As a result of this limitation, AR devices typically are formed so that the light propagating in the waveguide is incident on the OC multiple times at different locations of the OC. The light incident at each of these locations is diffracted out of the waveguide to provide a respective image that may be perceived by the user when the user's eye is properly positioned relative to the location (the location where the light is coupled out of the waveguide may be referred to as "pupils" or "exit pupils" of the waveguide). In this way, the user's eye may be positioned in multiple positions within an eye box defined in the space over the viewer's eye and still be able to perceive the image. The eye box must be oversized to allow for different eye positions, as well as different face shapes and sizes. However, in this approach, much or even most of the light may be wasted, because light is being directed into areas in the eye box where the user's eye is not present.

In some examples, the dynamically adjustable DOEs are configured to direct light out of an OC only where needed given the position of the user's eye or another target region where the light needs to be projected. The location of a user's eye may be detected using eye-tracking techniques, and the diffraction efficiency of one or more DOEs, such as output DOEs (i.e., OCs), can be controlled so that only the output DOEs pointing toward the target region are made highly efficient. This causes light to be diffracted out of the waveguide toward the location of the user's eye. In some examples, the efficiency of other DOEs, such as fold DOEs for redirecting light within a planar waveguide, may also be adjusted to direct a greater amount of the light traveling within the waveguide toward the desired output DOEs.

By providing a waveguide with adjustable DOEs configured to direct light toward a target region such as the location of an eye, some examples described herein may attempt to address one or more technical problems. Efficiency of an image projection system can be increased, and the intensity of light projected toward the user's eye increased, by only sending light to the portion of the eye box where the eye actually resides. The optical power needs of such a projection system can be decreased, because an entire large eye box no longer needs to be illuminated at full power. Furthermore, some examples may reduce stray light caused by diffraction from areas in output surface of the waveguide that are not needed for imaging at the user's eye location; this may have the effect of presenting a clearer, more distinct image to the user's eye.

In another set of examples, adjustable DOEs can be used to implement a stacked arrangement of color-specific input and/or output DOEs, each of which can be selectively activated (i.e., have its diffraction efficiency increased by applying a stimulus) or deactivated (i.e., have its diffraction efficiency decreased by removing or decreasing the stimulus) during a respective time period, such as a color sub frame of a color sequential display frame time.

By providing adjustable DOEs configured to selectively diffract light based on time-varying conditions, such as during different color sub frames, some examples described herein may attempt to address one or more technical problems. Relative to conventional color-specific stacked DOE approaches, the use of stacked adjustable DOEs may reduced light loss, ghosting, and/or stray lighting effects caused by light interacting with the wrong color-specific DOE (e.g., green light interacting with red and blue DOEs). Some examples may reduce the brightness of ambient stray light artifacts (e.g., rainbow effects), because each color-specific DOEs is only activated to diffract light for a portion of the frame time instead of the entire frame time (e.g., for a 30 color system, each color-specific DOE is only activated ⅓ of the time). Furthermore, some examples may eliminate the need to fabricate the waveguide with air gaps inserted in between each adjacent pair of stacked colors-specific DOEs.

Other technical features may be readily apparent to one skilled in the art from the following figures, descriptions, and claims.

FIG. 1 illustrates a cross-sectional view of light entering and reflecting within a waveguide having an input DOE and an output DOE. As described above, the DOEs operate by diffracting light. Light propagation typically occurs in isotropic media (vacuum, air, plastic, glass) where the dielectric and absorption are equal and constant regardless of the direction of the light. A DOE provides a non-isotropic medium for the propagating light, which effectively changes the direction of the light as the light is scattered by the non-isotropic medium. The non-isotropic medium consists of periodic media having regions of differing index of refraction, resulting in conditions in which the waves of light are scattered and add up in phase (i.e., cause constructive interference) in certain directions. In this way, non-isotropic DOEs enable control or steering of the direction of propagation of the light.

In the example illustrated in FIG. 1, a projector 132 projects light, shown as input ray 102, toward a waveguide body 142 at incident angle 104 relative to a surface normal of the waveguide body 142. Upon entering the waveguide body 142, which is made from a light-transmissive material having a different refractive index than the surrounding medium (e.g., air), the light refracts to travel at the waveguide refraction angle 106 as ray 108. Ray 108 encounters the input DOE 134, such as a diffraction grating. The input DOE 134 is configured to refract light such that it travels generally in direction 140, toward the right side of the waveguide body 142, by bouncing between the upper and lower surfaces of the waveguide body 142 via total internal reflection (TIR). In this example, ray 108 is refracted by the input DOE 134 into ray 114 traveling at first angle 112. First angle 112 is an angle sufficient to maintain TIR as the light continues propagating down the waveguide body 142 in direction 140, as rays 116, 118, 120, 122, 124, and 126.

Direction 140 is substantially parallel to the length of the waveguide body 142 (i.e., from left to right in the illustrated embodiment), and accordingly substantially tangential to an output surface 138 of the waveguide body 142 where the light entered the waveguide body 142, and where it will exit the waveguide body 142 after encountering the output DOE 136, as described below.

Upon encountering the output DOE 136, such as a further diffraction grating, a portion of the light refracts out of the output surface 138 of the waveguide body 142. The output DOE 136 is configured to refract light such that it travels generally normal to the output surface 138, or at a sufficient angle to the output surface 138 to avoid TIR. The first encounter with the output DOE 136 outputs first output ray 128, representing a portion of the light from ray 120. The light that remains within the waveguide body 142 as ray 122, after reflecting against the output surface 138 as ray 124, has a second encounter with the output DOE 136, which again refracts a portion of the light of ray 124 out of the waveguide body 142 as second output ray 130. This pattern continues as the light continues to propagate in direction 140 via TIR, with a portion of the light refracting out of the output surface 138 as further output rays upon each encounter with the output DOE 136.

In the case of a static, uniform output DOE 136, this pattern of reflection and diffraction limits the usefulness of the illustrated device for producing bright, uniform images across an eye box. A uniform output DOE 136 having a fixed diffraction efficiency across its length (i.e., left to right in this example) will result in diminished image brightness at the right-most portions of the waveguide body 142, as the light loses more and more power the farther it travels in direction 140. For example, an output DOE 136 having a uniform diffraction efficiency of 50% will refract 50% of the light as first output ray 128, then 25% of the light (remaining 50% of light times diffraction efficiency of 50%) as second output ray 130, with further diminishment by half at each subsequent encounter with the output DOE 136. Furthermore, when the light encounters the output DOE 136 fort the last time at the right-most end of the waveguide body 142, it will still have a portion of the light remaining inside the waveguide body 142, which may further reflect off elements at the right end of the waveguide body 142 and continue propagating in the opposite of direction 140, causing spurious images that interfere with image clarity.

Accordingly, some approaches use static DOEs that are non-uniform in their refractive index along direction 140. If the output DOE 136 has a different refractive index at each point of encounter with the light, the amount of light refracted out of output surface 138 for each output ray can be varied based on the distance along direction 140. For example, the output DOE 136 at the first encounter (producing first output ray 128) may have a diffraction efficiency of ⅙ (17%), such that 17% of the light is output as first output ray 128 and 83% continues to propagate by TIR. The output DOE 136 at the second encounter (producing second output ray 130) may have a diffraction efficiency of ⅕ (20%), such that 20% of the remaining light (83%×20%=17%) is output as second output ray 130 and 66% of the original light continues to propagate by TIR. This pattern continues, such that the third encounter is at a diffraction efficiency of 25%, the fourth encounter is at 33% efficiency, the fifth encounter is at 50% efficiency, and the sixth and final encounter is at 100% efficiency. Such a non-uniform configuration of the output DOE 136 results in six output rays, each having the same brightness (17% of the original light), with no light remaining inside the waveguide body 142. It will be appreciated that the diffraction efficiency of the output DOE 136 can be varied by various techniques, e.g., by gradually varying the shape of a diffraction grating in different regions along direction 140.

Figure 2:
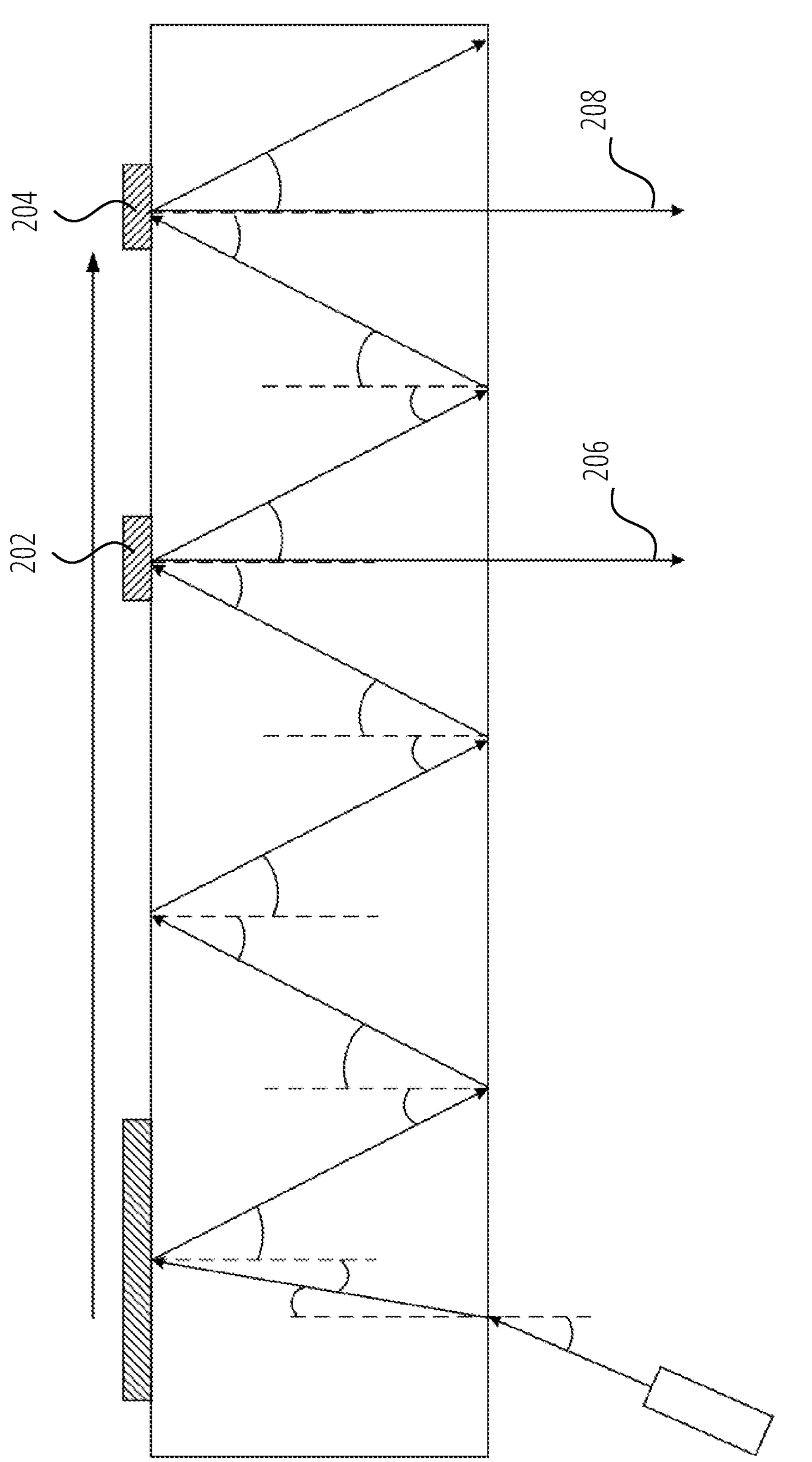
FIG. 2 illustrates a cross-sectional view of light entering and reflecting within a waveguide having an input DOE and multiple output DOEs, according to some examples.

FIG. 2 illustrates an example of a waveguide as in FIG. 1, but in which the single output DOE 136 is replaced by multiple discrete output DOEs 202, 204. The output DOEs 202, 204 are shown in FIG. 2 as separate elements, but it will be appreciated that they may be embodied in some examples as distinct regions of a continuous single output DOE, or as adjacent discrete output DOEs without gaps between them. An example of adjacent DOEs without gaps is described below with reference to FIG. 7; however, in FIG. 2 through FIG. 6, individual DOEs will be shown as discrete, spatially separated elements for visual clarity.

In approaches using output DOEs having non-uniform diffraction efficiencies across their length, such as the approach described above using increasing diffraction efficiencies at each encounter along direction 140, first output DOE 202 and second output DOE 204 shown in FIG. 2 could be implemented as DOEs having different diffraction efficiencies, such as 17% for first output DOE 202 (thereby generating first output ray 206 as 17% of total projected light) and 20% for second output DOE 204 (thereby generating second output ray 208 as 17% of total projected light) to form the first two output DOEs of a chain of six output DOEs forming a row or column of exit pupils of an eye box.

However, such an approach continues to exhibit the limitations described above. Because each output DOE in the chain outputs 17% of the available light, every such output ray that DOEs not reach the eye of a user represents wasted light.

Accordingly, in examples described herein, individual DOEs (such as first output DOE 202 and second output DOE 204) may be dynamically configurable to independently change their individual diffraction efficiency in response to a stimulus. This dynamic control of the diffraction efficiency of each of multiple DOEs of the waveguide allows a display system to direct light to a target region without wasting light (or creating unwanted ambient light) at locations outside of the target region.

Figure 3:
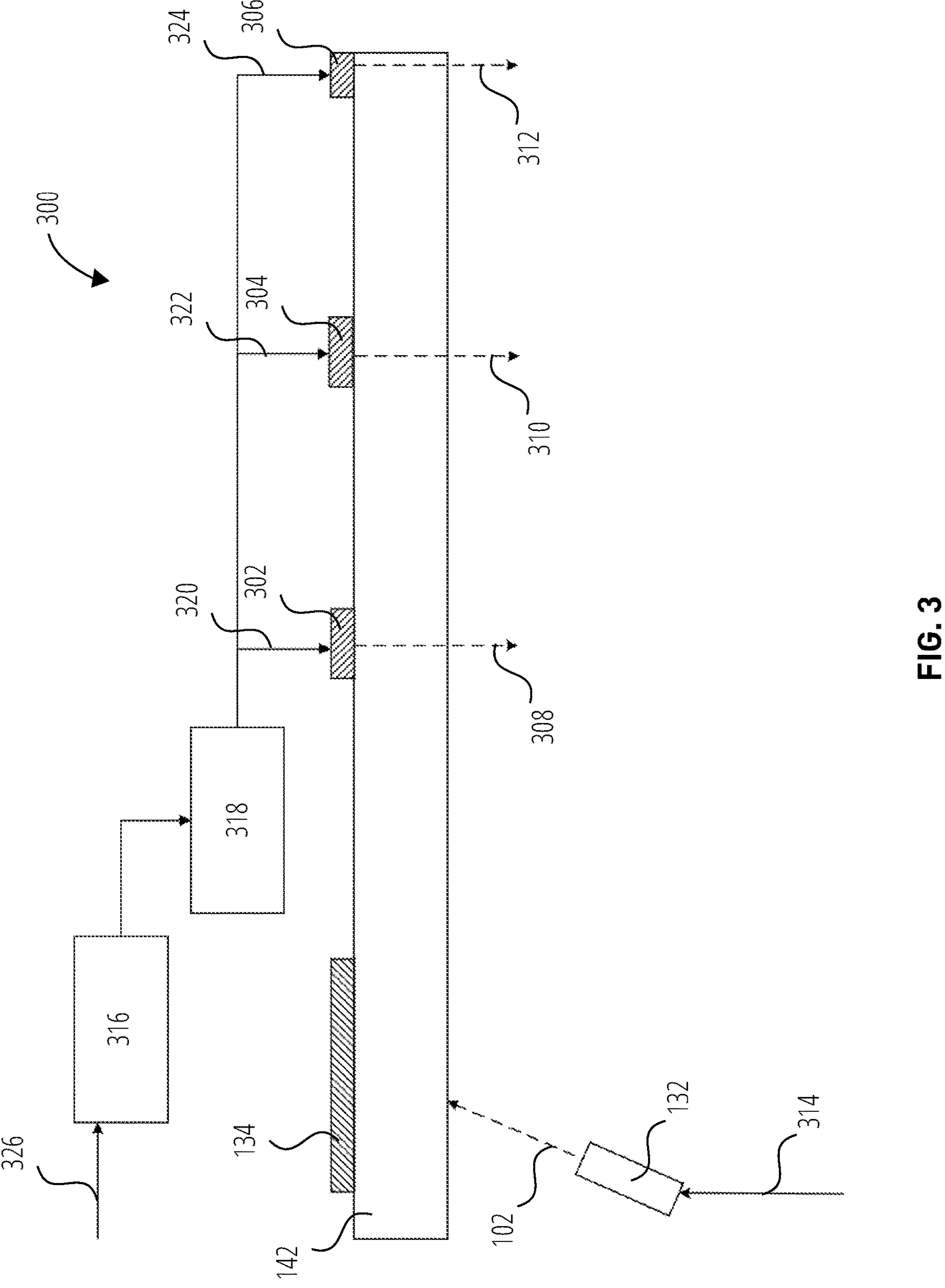
FIG. 3 is a block diagram of a waveguide having a controller, a DOE driver, and multiple dynamically addressable output DOEs, according to some examples.

FIG. 3 is a block diagram of a waveguide having multiple dynamically addressable output DOEs 302, 304, 306, according to various examples described herein.

As described herein, dynamically addressable DOEs (also called adjustable DOEs) are DOEs having a variable diffraction efficiency based on a stimulus applied to the DOE. Adjustable DOEs may be fabricated using a variety of different technologies. Some examples utilize a dynamically addressable diffractive optical element used in a waveguide-based AR system. In some examples, instead of light propagating within the waveguide being split into multiple exit pupils in a fixed pattern of uniform or non-uniform efficiency, the diffraction efficiency of the dynamically addressable DOE is selectively controlled to direct light having a maximum power from exit pupils corresponding to a target region, such as a detected location of a user's eye.

The waveguide 300 shown in FIG. 3 includes a controller 316, a DOE driver 318, and multiple dynamically addressable output DOEs 302, 304, 306 each having a dynamically adjustable diffraction efficiency in response to a stimulus provided by the DOE driver 318, which in turn is controlled by the controller 316.

The controller 316 may be implemented using a suitable combination of hardware and software logic suitable for performing the operations described herein, such as a microcontroller, a central processing unit and memory of a computing device, etc. In some examples, the controller may be implemented as a machine 1100 as described below with reference to FIG. 11. In some examples, the controller 316 receives target region data 326, such as eye-tracking data representative of a location of an eye. The eye-tracking data may be generated using any suitable means for eye-tracking. The controller 316 processes the target region data 326 to identify which exit pupils of the waveguide 300 are likely to output light toward the target region and controls the DOE driver 318 (e.g., vie electrical control signals sent via a data bus) to generate and provide separate and independent stimuli to each adjustable DOE (e.g., first stimulus 320 provided to first output DOE 302, second stimulus 322 provided to second output DOE 304, and third stimulus 324 provided to third output DOE 306). In response to the stimuli, the adjustable DOEs change their respective diffraction efficiencies to achieve the desired configuration of diffraction efficiencies across the waveguide body 142. This causes light projected from projector 132 (based on received projector control data 314, such as image data) and entering the waveguide body 142 (shown as input ray 102) to refract out of the waveguide body 142 at each encounter with an output DOE (e.g., as first output ray 308 after encountering first output DOE 302, as second output ray 310 after encountering second output DOE 304, or as third output ray 312 after encountering third output DOE 306) at a distinct and dynamically adjustable diffraction efficiency.

Thus, in some examples, a waveguide 300 is provided that includes a waveguide body 142 comprising an optically transmissive material having a refractive index different from a surrounding medium (e.g., air). The waveguide body 142 defines an output surface 138 and is configured to propagate light by total internal reflection in one or more directions (e.g., direction 140) substantially tangential to the output surface 138. The waveguide 300 includes one or more diffractive optical elements (e.g., first output DOE 302, second output DOE 304, and third output DOE 306) each configured to change its diffraction efficiency in response to a respective stimulus (e.g., first stimulus 320, second stimulus 322, and third stimulus 324, respectively). The waveguide 300 also includes a DOE driver 318 configured to provide the stimuli to each of the DOEs independently.

In various examples, a dynamically addressable DOE can be implemented using various different techniques. In some examples, a DOE can include a liquid crystal material, which may respond to a stimulus in the form of electrical stimulation in some examples. Holographic-Polymer Dispersed Liquid Crystals (HPDLC) can be used in some examples: diffraction gratings may be recorded interferometrically on photosensitive polymer with liquid crystals (LCs) dispersed within the grating. The grating formation promotes LCs phase separation. In the absence of an electrical field (e.g., without electrical stimulation), the LCs are randomly aligned, and the diffraction efficiency of the DOE is highest. In the presence of an electrical field (e.g., in the presence of electrical stimulation), the LCs align, and the index of refraction is matched to the surroundings, hence the diffraction efficiency is reduced or minimal. Electrical field strengths anywhere in between can proportionally affect the diffraction efficiency.

In some examples, surface relief DOEs with LCs can be used: instead of a traditional surface relief structure where the gaps between the features are filled with air, LCs are used as filler. Like HPDLCs described above, alignment of the LCs causes the structure to be less efficient.

In some examples, non-LC materials and/or non-electrical stimuli may be used. Elastic physical deformation of a DOE can alter its diffraction efficiency. A diffraction grating can be deformed to the point that is not on-Bragg or otherwise at a high efficiency for the incident light, by applying mechanical compression and/or tension, or by applying thermal deformation and/or relaxation due to a change in temperature. Thus, in some examples the stimulus may include a physical deformation of at least one DOE and/or a change in temperature of at least one DOE.

Depending on the nature of the stimulus used to adjust the diffraction efficiency of the DOEs, the DOE driver 318 may take different forms and/or may operate according to different principles. In LC-based systems using electrical signals as the stimuli, conductive channels may be provided through or adjacent to the waveguide body to enable selective electrical stimulation of each region or each DOE independently, in accordance with known LC control methodologies. In some examples using mechanical compression and/or tension as a stimulus, mechanical actuators such as piezoelectric elements may be used to selectively deform different regions of a DOE (and/or distinct DOES). In some examples using thermal stimuli to deform portions of a DOE or distinct DOEs, a heating element, such as an electrothermal heating element, may be used to selectively heat DOEs or portions thereof. The DOE driver 318 may be configured to selectively provide electrical power to the various electrical, mechanical, and/or thermal components used to provide the stimuli to the various DOEs or regions thereof.

The waveguide body 142, as described above, is formed from a optically transmissive material. In some examples, the optically transmissive material includes a dielectric material. In some examples, the optically transmissive material includes a plastic material. In some examples, the optically transmissive material includes a glass material.

The illustrated examples thus far address only light propagating within the waveguide body 142 in a single direction 140. However, some examples will describe waveguides in which the light propagating by TIR travels in more than one direction based at least in part on the diffraction efficiencies of fold DOEs of the waveguide.

Figure 4:
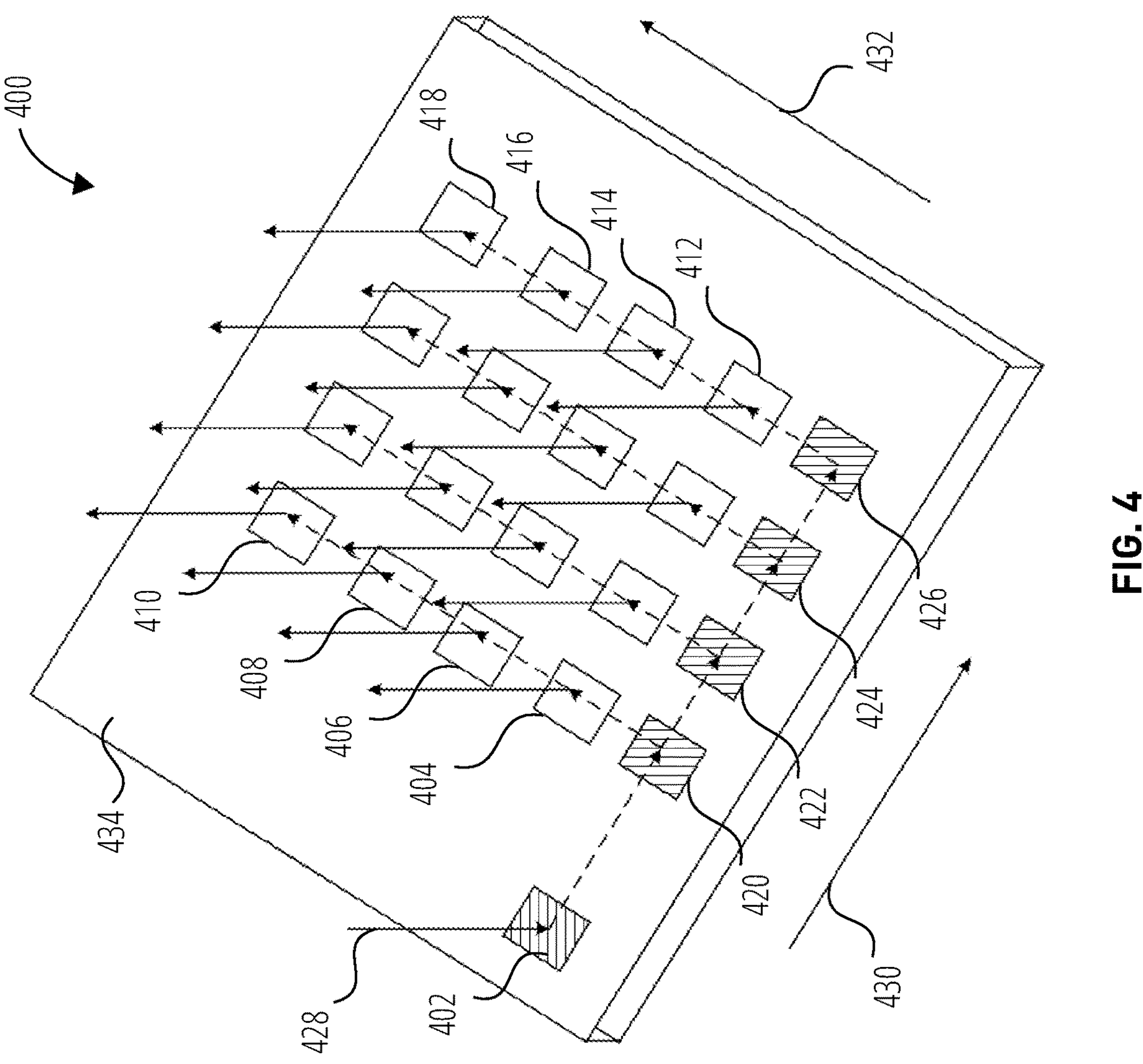
FIG. 4 illustrates a perspective view of a waveguide having multiple fold DOEs and multiple output DOEs, according to some examples.

FIG. 4 illustrates a two-dimensional waveguide 400. The two-dimensional waveguide 400 includes a waveguide body 434 embodied as a substantially two-dimensional slab, such as a display surface of an AR display (e.g., a lens of a pair of glasses). The two-dimensional waveguide 400 includes an input DOE 402 for receiving projected light (shown as input ray 428). The light propagates by TIR within the waveguide body 434 in first direction 430, according to a similar pattern as shown in FIG. 1 above with respect to direction 140.

However, the two-dimensional waveguide 400 includes a series of fold DOEs configured to redirect a portion of the light propagating via TIR in the first direction 430, via diffraction, to continue propagating within the waveguide body 434 via TIR in a second direction 432. When the light encounters a first fold DOE 420, a portion of the light (as determined by the diffraction efficiency of first fold DOE 420) is diffracted at a TIR-sufficient angle to propagate in second direction 432, thereafter encountering first output DOE 404, second output DOE 406, third output DOE 408, and fourth output DOE 410 in sequence. The remainder of the light continues to propagate in first direction 430 until it encounters second fold DOE 422, third fold DOE 424, and fourth fold DOE 426, potentially losing some of the light in each encounter to diffraction causing propagation in second direction 432. Thus, the longest path that light travels in the illustrated example is to encounter the input DOE 402, propagate in first direction 430 to encounter first fold DOE 420, second fold DOE 422, third fold DOE 424, and fourth fold DOE 426, being diffracted by fourth fold DOE 426 to propagate in second direction 432, and encountering 13th output DOE 412, 14th output DOE 414, 15th output DOE 416, and 16th output DOE 418, at which point it is diffracted out of the waveguide body 434.

It will be appreciated that, whereas the light propagating by TIR bounces within the waveguide body 434 is shown travelling in first direction 430 and second direction 432 in straight lines for visual clarity, in reality it exhibits a similar zig-zag reflection path to the light in FIG. 1.

The fold DOEs are DOEs configured to split and fold propagating light, such as a diffraction grating formed internally to the waveguide body 434. Diffraction efficiency at the fold DOE can be dynamically adjusted as described above with reference to FIG. 3. Adjustment of the diffraction efficiency of the fold DOEs results in propagating light being folded and split only where, and only to the degree, necessary. Thus, in the illustrated example, rows of output DOEs projecting along second direction 432 can be selectively activated or deactivated so that light is not wasted by being directed to rows that do not include output DOEs oriented toward the target region. Examples of such operation are described below with reference to FIG. 5 and FIG. 6.

Figure 5:
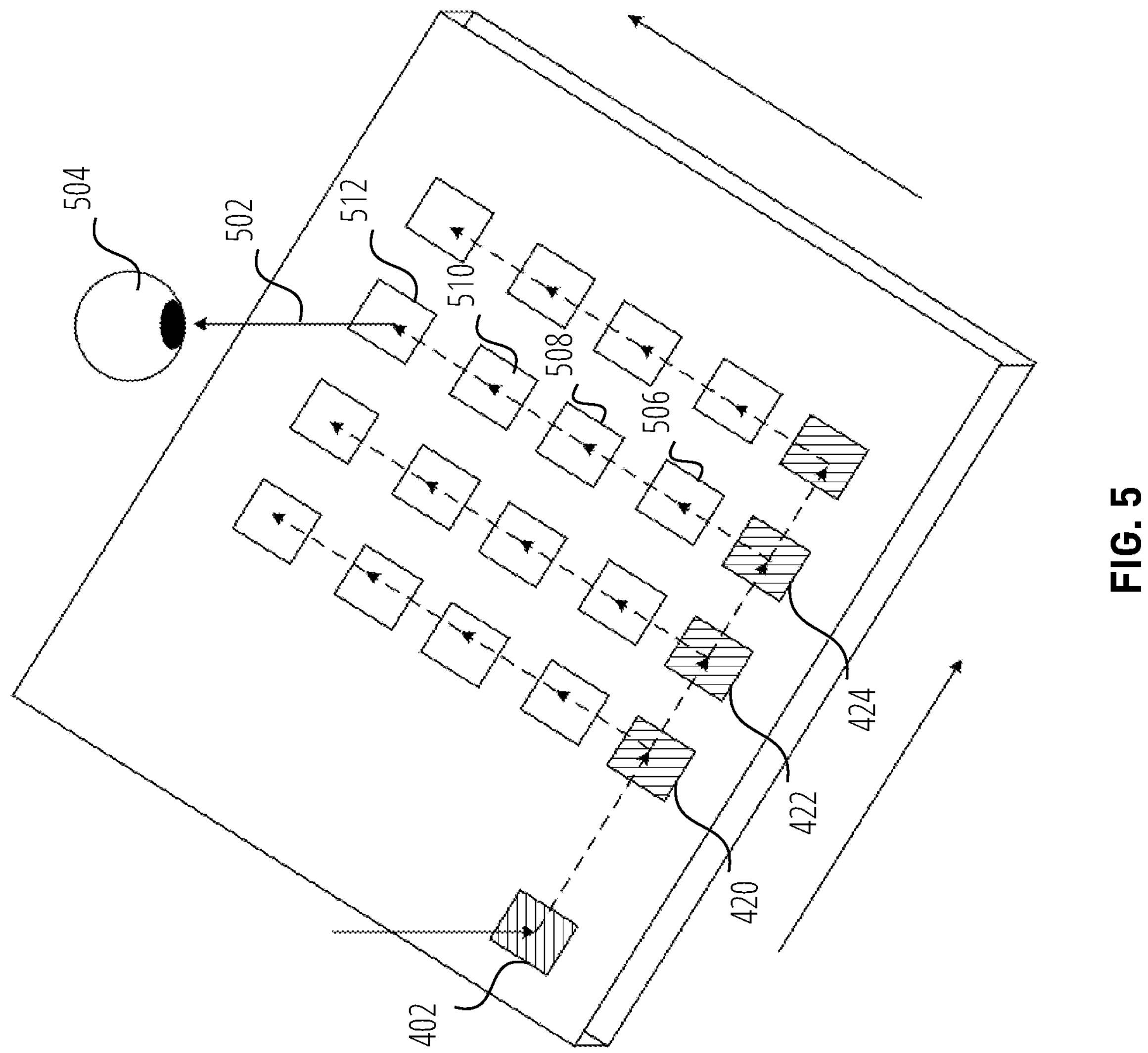
FIG. 5 illustrates the waveguide of FIG. 4 showing the fold DOEs and output DOEs stimulated to direct light out of a single output DOE toward the location of an eye, according to some examples.

FIG. 5 illustrates the two-dimensional waveguide 400 of FIG. 4 showing the fold DOEs and output DOEs stimulated to direct light (output ray 502) out of a single output DOE (12th output DOE 512) toward the location of an eye 504. In this example, the DOE driver stimulates the various fold DOEs and output DOEs such that first fold DOE 420 and second fold DOE 422 have minimal diffraction efficiency, causing most or all of the received light to propagated to the third fold DOE 424. Third fold DOE 424 is stimulated to have maximal diffraction efficiency, causing most or all of the remaining light to propagate in second direction 432 along the third row of output DOEs. The light encounters 9th output DOE 506, 10th output DOE 508, and 11th output DOE 510, all of which are stimulated to have minimal diffraction efficiency. Upon encountering 12th output DOE 512, stimulated to have maximal diffraction efficiency, most or all of the remaining light is diffracted out of the waveguide body 434 as output ray 502, to travel toward the target region, in this case the location of eye 504.

This pattern of stimuli may be achieved, in some examples, by tracking the location of eye 504 using an eye-tracking system, thereby generating eye-tracking data. The eye-tracking data is provided to the controller 316, with or without preprocessing, as target region data 326. The controller processes the target region data 326 and controls the DOE driver 318, based on the target region data 326, to drive the stimulus pattern described above.

Thus, in some examples, the DOEs include a first one or more output DOEs (e.g., 12th output DOE 512) configured to diffract light out of the output surface toward the target region, and a second one or more output DOEs (e.g., all other output DOEs of the device) configured to diffract light out of the output surface toward a location outside of the target region. The stimuli provided to the DOEs are configured to increase the diffraction efficiency of the first one or more output DOEs relative to the diffraction efficiency of the second one or more output DOEs. In some examples, increasing the diffraction efficiency of the first one or more output DOEs relative to the diffraction efficiency of the second one or more output DOEs includes increasing the diffraction efficiency of the first one or more output DOEs. In some examples, increasing the diffraction efficiency of the first one or more output DOEs relative to the diffraction efficiency of the second one or more output DOEs includes decreasing the diffraction efficiency of the second one or more output DOEs. Some examples may do both.

In some examples, the waveguide (e.g., waveguide 300 or two-dimensional waveguide 400) includes a controller 316 configured to receive target region data 326, and control the DOE driver 318 to provide the stimuli based on the target region data 326. In some examples, the stimuli provided to the DOEs are configured to direct the light toward a target region by diffracting the light out of the waveguide body 142 via the output surface 138.

In some examples, the one or more DOEs include a fold DOE (e.g., third fold DOE 424) configured to diffract light propagating in a first direction 430 to propagate in a second direction 432. The light propagating in the second direction 432 is more likely to reach the target region than the light propagating in the first direction 430, and the stimuli provided to the DOEs are configured to increase the diffraction efficiency of the fold DOE (e.g., third fold DOE 424) such that the amount of light diffracted to propagate in the second direction 432 is increased.

In some examples, the target region includes a location of an eye 504, and the target region data 326 includes eye tracking data representative of the location of the eye 504.

Figure 6:
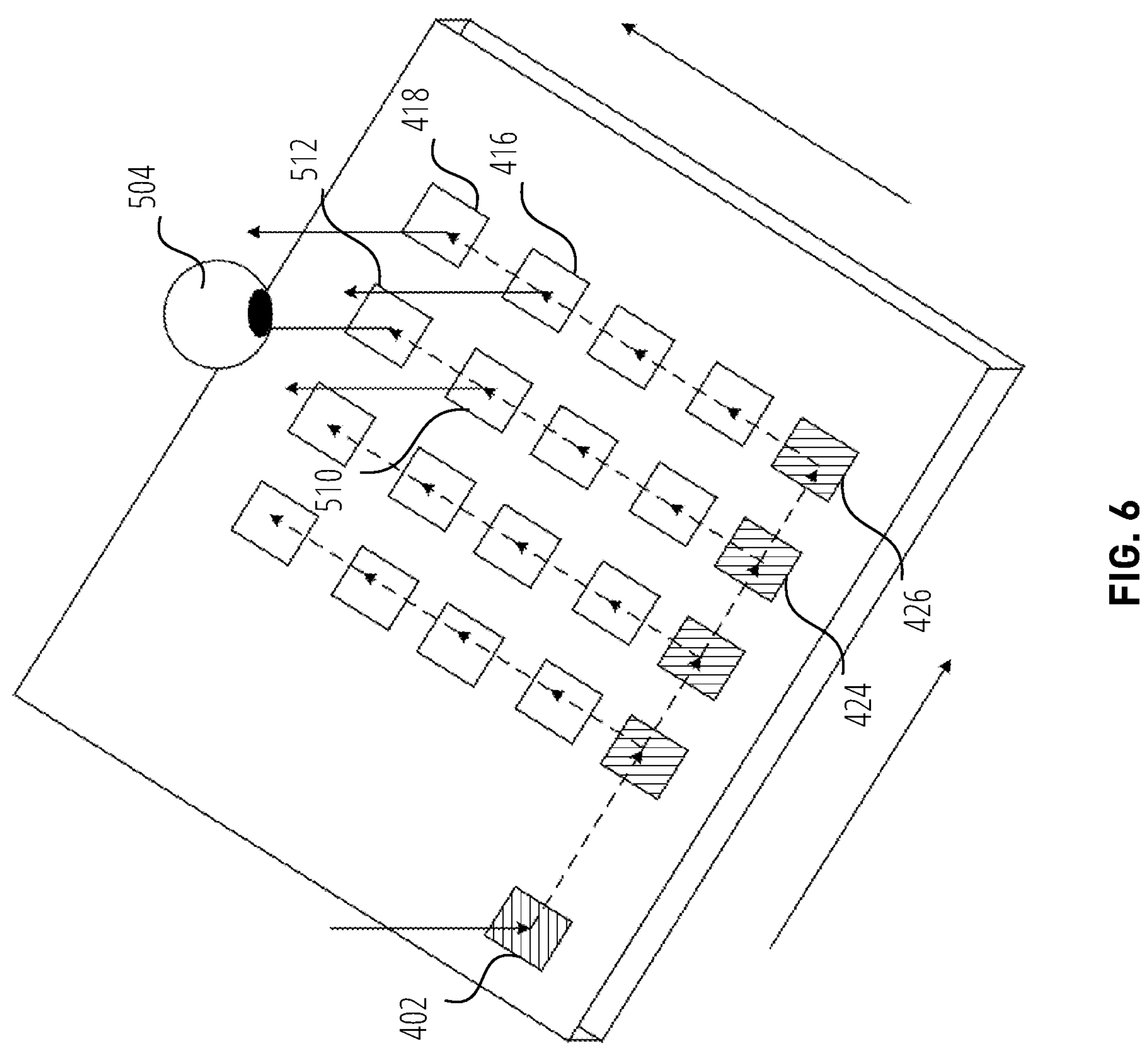
FIG. 6 illustrates the waveguide of FIG. 4 showing the fold DOEs and output DOEs stimulated to direct light out of a set of multiple output DOEs toward the location of an eye, according to some examples.

FIG. 6 illustrates the two-dimensional waveguide 400 of FIG. 4 showing the fold DOEs and output DOEs stimulated to direct light out of a set of multiple output DOEs toward the location of the eye 504. In some cases, the location of the eye may be uncertain enough, or may span more than one exit pupil, such that it is desirable to project light out of multiple exit pupils to ensure that the image is optimally presented to the eye.

In this example, the eye 504 defines a target region that spans four of the output DOEs: 11th output DOE 510, 12th output DOE 512, 15th output DOE 416, and 16th output DOE 418. Accordingly, the diffraction efficiency of the various DOEs may be configured as follows in an ideal case (e.g., a case in which diffraction efficiency is perfectly controllable): all fold DOEs other than third fold DOE 424 and fourth fold DOE 426 are at minimal diffraction efficiency; third fold DOE 424 is at 50% diffraction efficiency; fourth fold DOE 426 is at 100% diffraction efficiency. The output DOEs in the first two rows are irrelevant, because (in the ideal case) no light is diffracted toward them; however, in a real-world non-ideal case, it may be preferable to minimize the diffraction efficiency of these output DOEs to avoid spurious light exiting the waveguide body 434. Of the output DOEs in the last two rows, the first two output DOEs in series are stimulated to have minimal diffraction efficiency; the third output DOE in each row (i.e., 11th output DOE 510 and 15th output DOE 416) are set to 50% diffraction efficiency; and the final output DOE in each row (i.e., 12th output DOE 512 and 16th output DOE 418) are set to 100% diffraction efficiency. In the ideal case, this stimulus pattern will result in four outputs of equal brightness at each of the four output DOEs 11th output DOE 510, 12th output DOE 512, 15th output DOE 416, and 16th output DOE 418. It will be appreciated that real-world implementations will likely have non-ideal optical characteristics and may need to be adjusted accordingly; furthermore, it will be appreciated that, in some intended applications, it may be desirable to have non-uniform brightness at different locations.

Figure 7:
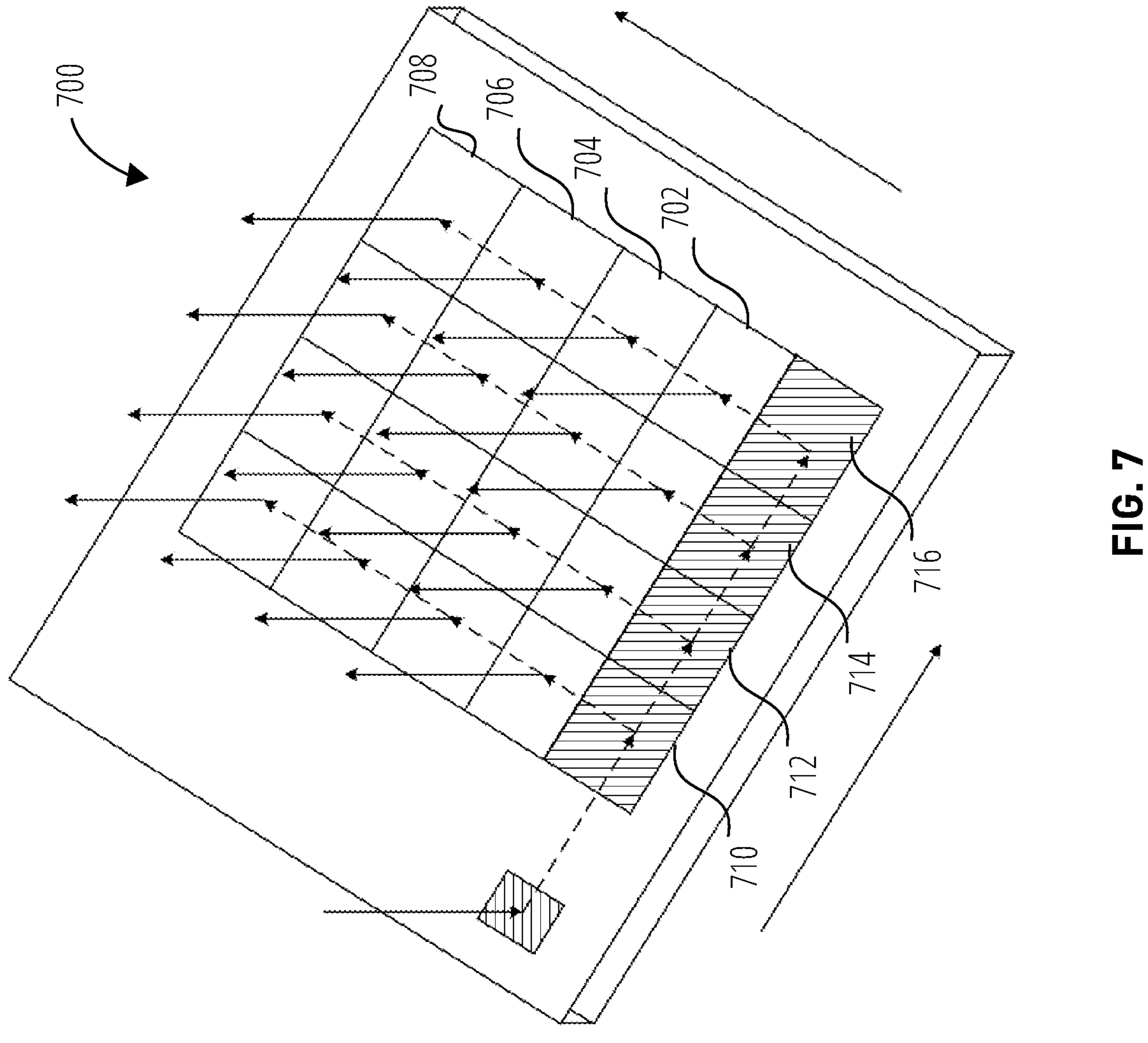
FIG. 7 illustrates a perspective view of a waveguide having multiple adjacent fold DOEs and multiple adjacent output DOEs, according to some examples.

FIG. 7 illustrates a continuous DOE waveguide 700 having a continuous DOE, which may be regarded as multiple adjacent fold DOEs and multiple adjacent output DOEs, each DOE defining a region of the single continuous DOE. In other examples, the output DOEs may be adjacent, but not the fold DOEs, or vice versa. In some examples, the various regions can be dynamically reconfigured such that a given diffraction efficiency can be applied via stimulus to a region of a dynamically defined shape and/or size, or a continuously-varying diffraction efficiency may be applied over the area of the continuous DOE.

Thus, the continuous DOE waveguide 700 includes a continuous DOE divided into regions, such as first fold DOE 710 defining a first fold region, second fold DOE 712 defining a second fold region, third fold DOE 714 defining a third fold region, and fourth fold DOE 716 defining a fourth fold region, as well as 13th output DOE 702 defining a first output region, 14th output DOE 704 defining a second output region, fourth fold DOE 716 defining a third output region, and 16th output DOE 708 defining a fourth output region. The components of continuous DOE waveguide 700 are otherwise analogous to those of two-dimensional waveguide 400.

Whereas examples described above are directed to a waveguide with DOEs having spatially-modulated diffraction efficiency, the techniques described herein may also be applied to provide DOEs that selectively propagate light according to time-varying conditions. For example, a waveguide may provide multiple color-specific DOEs that can bee activated during different color sub frames of a color sequential display.

A color-sequential display cycles through temporally separated sub frames for each of two or more colors (e.g., red, green, and blue). The vision persistence of the human eye fuses the sequence of color sub frames together into one image containing a mix of colors.

Figure 8:
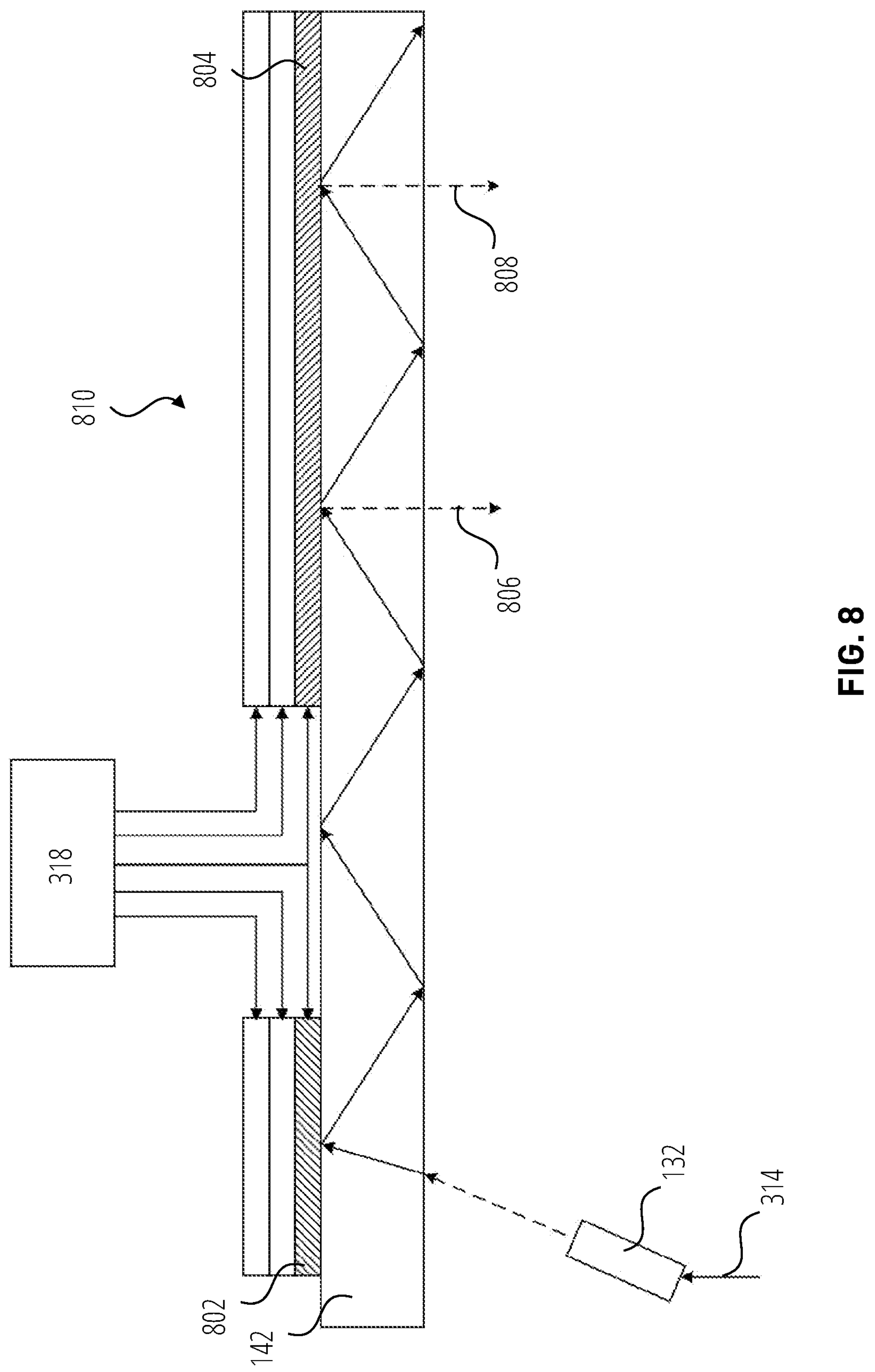
FIG. 8 illustrates a cross-sectional view of light entering and reflecting within a waveguide having a plurality of stacked color-specific input DOEs and a plurality of stacked color-specific output DOEs, showing a first input DOE and a first output DOE corresponding to a first color stimulated, according to some examples.

FIG. 8 illustrates a cross-sectional view of light entering and reflecting within a color sequential waveguide 810 having a plurality of stacked color-specific input DOEs and a plurality of stacked color-specific output DOEs. The DOEs corresponding to each color can be activated during a corresponding color sub frame defining a time period in which light of the respective color is projected into the waveguide.

The example shown in FIG. 8 shows a first input DOE 802 and a first output DOE 804 both corresponding to a first color (e.g., blue). The first input DOE 802 and first output DOE 804 are configured to optimize the diffraction of light of the first color (e.g., blue light having a wavelength below 495 nm). A projector 132 is configured to sequentially project light of each of three colors (e.g., red, green, and blue) during three respective color sub frames spanning three time periods. The projector control data 314 that controls the timing and color of the light projected by the projector 132 may be synchronized with control data provided to a controller (not shown) such that the controller drives the DOE driver 318 to stimulate each color-specific DOE appropriately during each time period.

During a first period (e.g., a blue color sub frame), the DOE driver stimulates the first input DOE 802 and first output DOE 804 to have high diffraction efficiency relative to the other color specific DOEs in the stack (as described below with reference to FIG. 9 and FIG. This causes the light of the first color (e.g., blue light) projected by the projector 132 to diffract at the first input DOE 802, thereby optimizing the amount of light propagating via TIR. Upon encountering the first output DOE 804, the light of the first color is again optimally diffracted as first output ray 806 and then second output ray 808.

Figure 9:
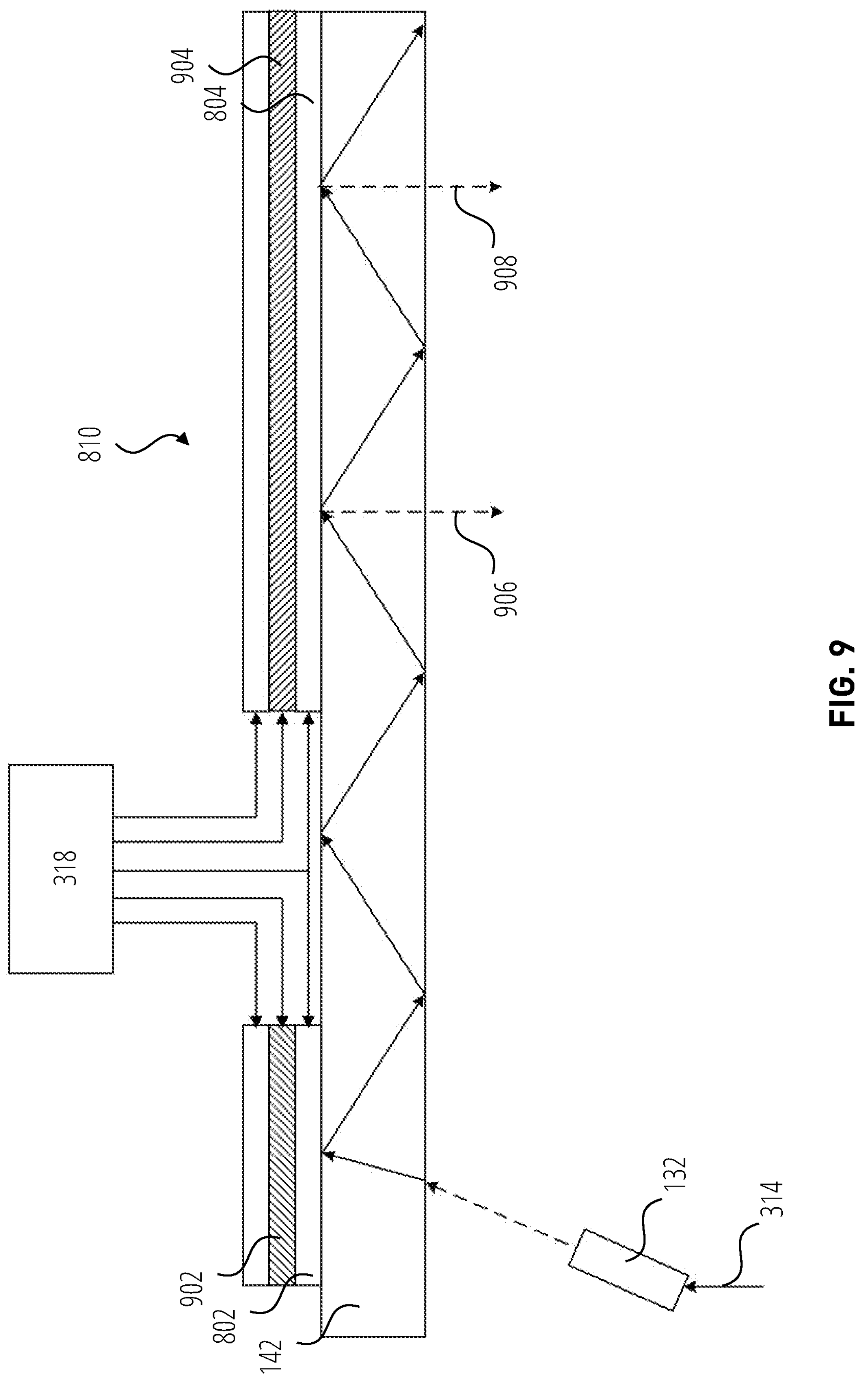
FIG. 9 illustrates a cross-sectional view of light entering and reflecting within the waveguide of FIG. 8, showing a second input DOE and a second output DOE corresponding to a second color stimulated, according to some examples.

FIG. 9 illustrates the color sequential waveguide 810 of FIG. 8, showing an activated second input DOE 902 and an activated second output DOE 904, both optimized to diffract light of a second color (e.g., green), during a second period (e.g., a green color sub frame). In this example, while light of the second color (e.g., green light having a dominant wavelength at or near 510 nm) is projected by the projector 132, the first input DOE 802 and first output DOE 804 are deactivated (e.g., have a minimal diffraction efficiency), while the second input DOE 902 and second output DOE 904 are activated, causing the light of the second color to optimally diffract into TIR upon encountering second input DOE 902, and to optimally diffract out of the waveguide as first output ray 906 and then second output ray 908 upon encountering the second output DOE 904.

Figure 10:
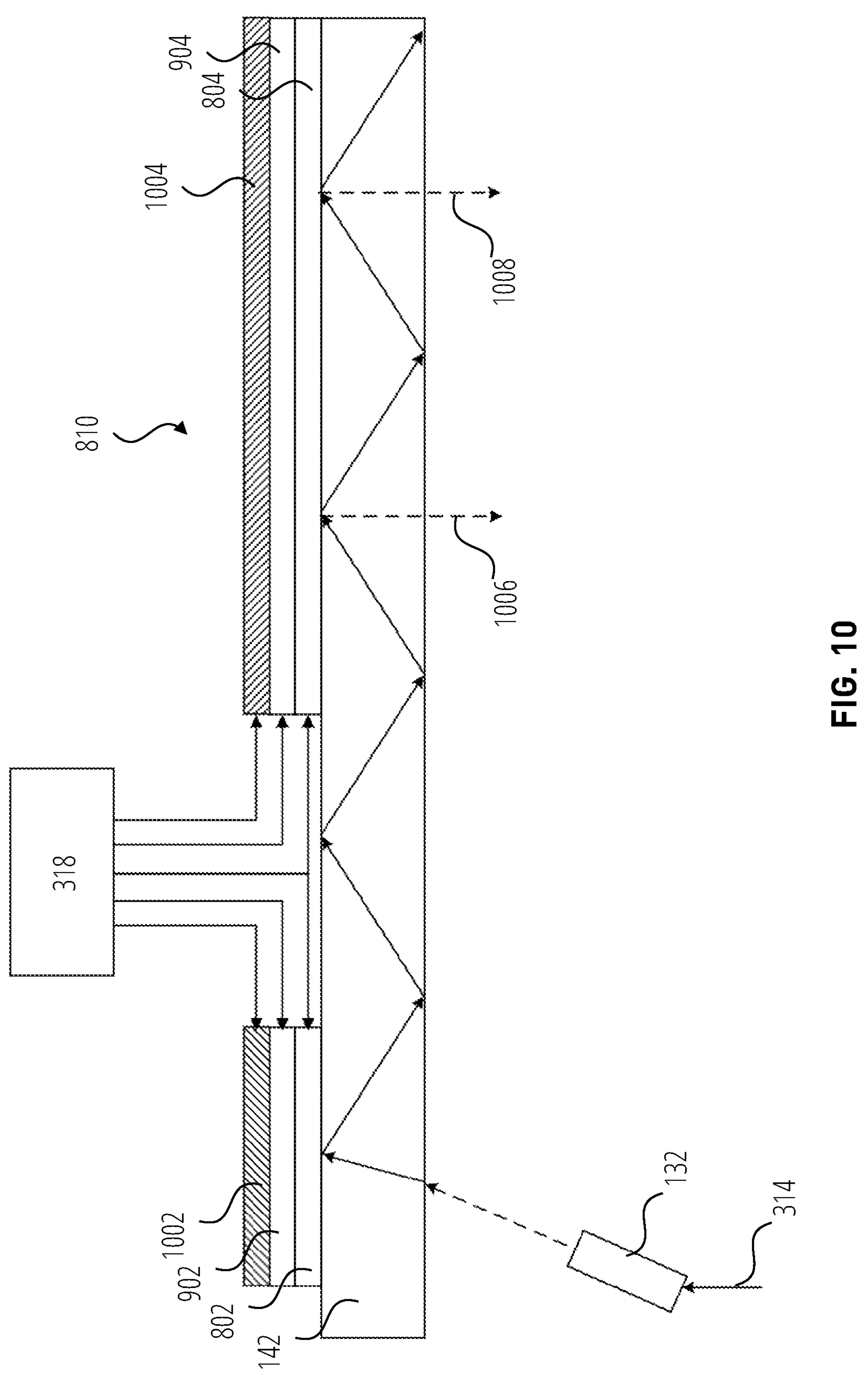
FIG. 10 illustrates a cross-sectional view of light entering and reflecting within the waveguide of FIG. 8, showing a third input DOE and a third output DOE corresponding to a third color stimulated, according to some examples.

FIG. 10 illustrates the color sequential waveguide 810 of FIG. 8, showing an activated third input DOE 1002 and an activated third output DOE 1004, both optimized to diffract light of a third color (e.g., red), during a third period (e.g., a red color sub frame). In this example, while light of the third color (e.g., red light having a wavelength above 620 nm) is projected by the projector 132, the first input DOE 802, first output DOE 804, second input DOE 902, and second output DOE 904 are deactivated (e.g., have a minimal diffraction efficiency), while the third input DOE 1002 and third output DOE 1004 are activated, causing the light of the third color to optimally diffract into TIR upon encountering third input DOE 1002, and to optimally diffract out of the waveguide as first output ray 1006 and then second output ray 1008 upon encountering the third output DOE 1004.

Thus, in some examples, the DOEs selectively propagate light according to time-varying conditions, and the time-varying conditions comprise a temporal sequence of color-specific periods includes a first period in which light of a first color propagates within the waveguide body, and a second period in which light of a second color propagates within the waveguide body. The one or more DOEs comprise a first one or more DOEs (e.g., first input DOE 802 and first output DOE 804) configured to diffract light of the first color, and a second one or more DOEs (e.g., second input DOE 902 and second output DOE 904) configured to diffract light of the second color. The stimuli are configured to increase the diffraction efficiency of the first one or more DOEs relative to the diffraction efficiency of the second one or more DOEs during the first period, and increase the diffraction efficiency of the second one or more DOEs relative to the diffraction efficiency of the first one or more DOEs during the second period.

In some examples, the first one or more DOEs comprise a first one or more output DOEs (e.g., first output DOE 804) configured to diffract light of the first color out of the output surface. The second one or more DOEs comprise a second one or more output DOEs (e.g., second output DOE 904) configured to diffract light of the second color out of the output surface. The first one or more output DOEs and the second one or more output DOEs may be arranged in a stacked configuration such that during the first period, relatively more light enters the first one or more output DOEs and is diffracted out of the output surface by the first one or more output DOEs, and during the second period, relatively more light passes through the first one or more output DOEs, enters the second one or more output DOEs, and is diffracted out of the output surface by the second one or more output DOEs.

In some examples, the first one or more DOEs further comprise a first one or more input DOEs (e.g., first input DOE 802) configured to diffract light of the first color into the waveguide body at an angle sufficient to achieve the total internal reflection. The second one or more DOEs further comprise a second one or more input DOEs (e.g., second input DOE 902) configured to diffract light of the second color into the waveguide body at an angle sufficient to achieve total internal reflection. The first one or more input DOEs and the second one or more input DOEs may be arranged in a stacked configuration such that during the first period, relatively more light enters the first one or more input DOEs and is diffracted into the waveguide body by the first one or more input DOEs, and during the second period, relatively more light passes through the first one or more input DOEs, enters the second one or more input DOEs, and is diffracted into the waveguide body by the second one or more output DOEs.

In some examples, the stacked arrangements do not include air gaps between the first one or more output DOEs and the second one or more output DOEs (e.g., between first output DOE 804 and second output DOE 904), or between the first one or more input DOEs and the second one or more input DOEs (e.g., between first input DOE 802 and second input DOE 902).

Machine Architecture

Figure 11:
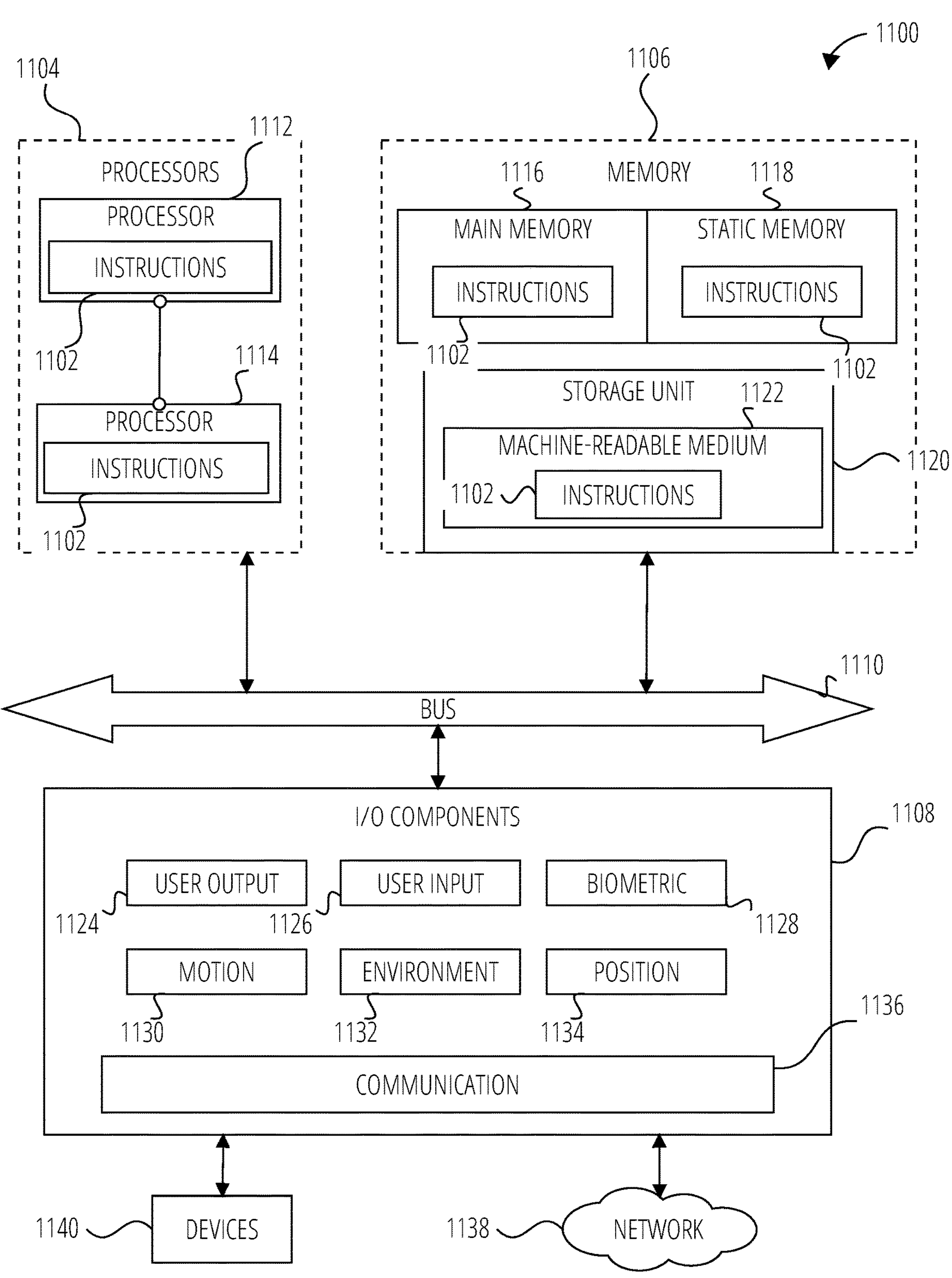
FIG. 11 is a diagrammatic representation of a machine in the form of a computer system within which a set of instructions may be executed to cause the machine to perform any one or more of the methodologies discussed herein, according to some examples.

FIG. 11 is a diagrammatic representation of the machine 1100 within which instructions 1102 (e.g., software, a program, an application, an applet, an app, or other executable code) for causing the machine 1100 to perform any one or more of the methodologies discussed herein may be executed. For example, the instructions 1102 may cause the machine 1100 to execute any one or more of the methods described herein. The instructions 1102 transform the general, non-programmed machine 1100 into a particular machine 1100 programmed to carry out the described and illustrated functions in the manner described. The machine 1100 may operate as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch, a pair of augmented reality glasses), a smart home device (e.g., a smart appliance), other smart devices, a web appliance, a network router, a network switch, a network bridge, or any machine capable of executing the instructions 1102, sequentially or otherwise, that specify actions to be taken by the machine 1100. Further, while a single machine 1100 is illustrated, the term "machine" shall also be taken to include a collection of machines that individually or jointly execute the instructions 1102 to perform any one or more of the methodologies discussed herein. In some examples, the machine 1100 may comprise both client and server systems, with certain operations of a particular method or algorithm being performed on the server-side and with certain operations of the particular method or algorithm being performed on the client-side.

The machine 1100 may include processors 1104, memory 1106, and input/output I/O components 1108, which may be configured to communicate with each other via a bus 1110. In an example, the processors 1104 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1112 and a processor 1114 that execute the instructions 1102. The term "processor" is intended to include multi-core processors that may comprise two or more independent processors (sometimes referred to as "cores") that may execute instructions contemporaneously. Although FIG. 11 shows multiple processors 1104, the machine 1100 may include a single processor with a single-core, a single processor with multiple cores (e.g., a multi-core processor), multiple processors with a single core, multiple processors with multiples cores, or any combination thereof.

The memory 1106 includes a main memory 1116, a static memory 1118, and a storage unit 1120, both accessible to the processors 1104 via the bus 1110. The main memory 1106, the static memory 1118, and storage unit 1120 store the instructions 1102 embodying any one or more of the methodologies or functions described herein. The instructions 1102 may also reside, completely or partially, within the main memory 1116, within the static memory 1118, within machine-readable medium 1122 within the storage unit 1120, within at least one of the processors 1104 (e.g., within the processor's cache memory), or any suitable combination thereof, during execution thereof by the machine 1100.

The I/O components 1108 may include a wide variety of components to receive input, provide output, produce output, transmit information, exchange information, capture measurements, and so on. The specific I/O components 1108 that are included in a particular machine will depend on the type of machine. For example, portable machines such as mobile phones may include a touch input device or other such input mechanisms, while a headless server machine will likely not include such a touch input device. It will be appreciated that the I/O components 1108 may include many other components that are not shown in FIG. 11. In various examples, the I/O components 1108 may include user output components 1124 and user input components 1126. The user output components 1124 may include visual components (e.g., a display such as a waveguide and/or projector as described herein, a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1126 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1108 may include biometric components 1128, motion components 1130, environmental components 1132, or position components 1134, among a wide array of other components. For example, the biometric components 1128 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1130 include acceleration sensor components (e.g., accelerometer), gravitation sensor components, rotation sensor components (e.g., gyroscope).

The environmental components 1132 include, for example, one or more cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), depth sensors (such as one or more LIDAR arrays), or other components that may provide indications, measurements, or signals corresponding to a surrounding physical environment.

With respect to cameras, the machine 1100 may have a camera system comprising, for example, front cameras on a front surface of the machine 1100 and rear cameras on a rear surface of the machine 1100. The front cameras may, for example, be used to capture still images and video of a user of the machine 1100 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the machine 1100 may also include a 360° camera for capturing 360° photographs and videos.

Further, the camera system of the machine 1100 may include dual rear cameras (e.g., a primary camera as well as a depth-sensing camera), or even triple, quad or penta rear camera configurations on the front and rear sides of the machine 1100. These multiple cameras systems may include a wide camera, an ultra-wide camera, a telephoto camera, a macro camera, and a depth sensor, for example. The system may additionally include infra-red cameras to permit hand gesture tracking, eye position tracking or night vision, for example.

The position components 1134 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1108 further include communication components 1136 operable to couple the machine 1100 to a network 1138 or devices 1140 via respective coupling or connections. For example, the communication components 1136 may include a network interface component or another suitable device to interface with the network 1138. In further examples, the communication components 1136 may include wired communication components, wireless communication components, cellular communication components, satellite communication, Near Field Communication (NFC) components, Bluetooth® components (e.g., Bluetooth® Low Energy), WiFi® components, Zigbee, Ant+, and other communication components to provide communication via other modalities. The devices 1140 may be another machine or any of a wide variety of peripheral devices (e.g., a peripheral device coupled via a USB).

Moreover, the communication components 1136 may detect identifiers or include components operable to detect identifiers. For example, the communication components 1136 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 1136, such as location via Internet Protocol (IP) geolocation, location via Wi-Fi® signal triangulation, location via detecting an NFC beacon signal that may indicate a particular location, and so forth.

The various memories (e.g., main memory 1116, static memory 1118, and memory of the processors 1104) and storage unit 1120 may store one or more sets of instructions and data structures (e.g., software) embodying or used by any one or more of the methodologies or functions described herein. These instructions (e.g., the instructions 1102), when executed by processors 1104, cause various operations to implement the disclosed examples.

The instructions 1102 may be transmitted or received over the network 1138, using a transmission medium, via a network interface device (e.g., a network interface component included in the communication components 1136) and using any one of several well-known transfer protocols (e.g., hypertext transfer protocol (HTTP)). Similarly, the instructions 1102 may be transmitted or received using a transmission medium via a coupling (e.g., a peer-to-peer coupling) to the devices 1140.

Software Architecture

Figure 12:
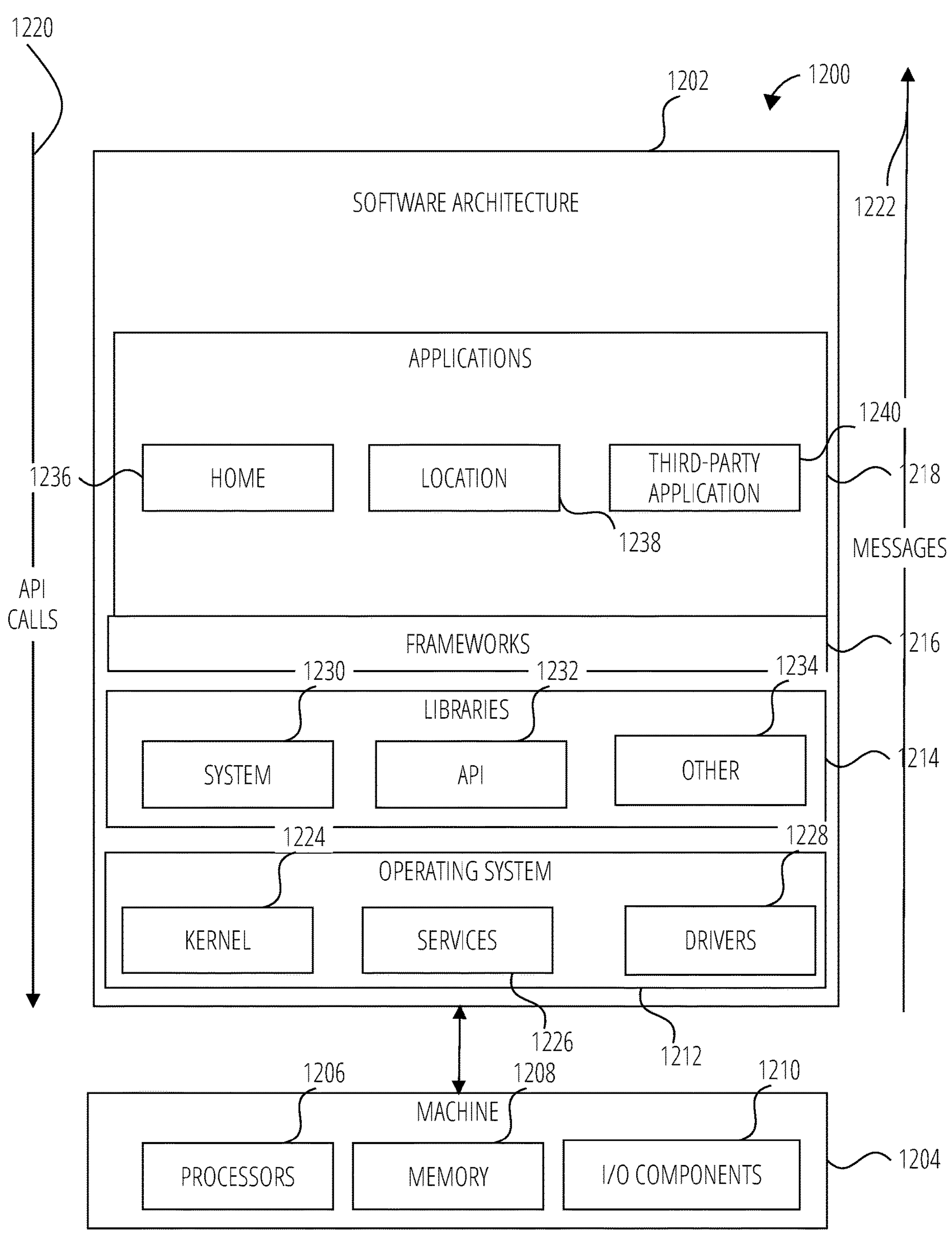
FIG. 12 is a block diagram showing a software architecture within which examples may be implemented.

FIG. 12 is a block diagram 1200 illustrating a software architecture 1202, which can be installed on any one or more of the devices described herein. The software architecture 1202 is supported by hardware such as a machine 1204 that includes processors 1206, memory 1208, and I/O components 1210. In this example, the software architecture 1202 can be conceptualized as a stack of layers, where each layer provides a particular functionality. The software architecture 1202 includes layers such as an operating system 1212, libraries 1214, frameworks 1216, and applications 1218. Operationally, the applications 1218 invoke API calls 1220 through the software stack and receive messages 1222 in response to the API calls 1220.

The operating system 1212 manages hardware resources and provides common services. The operating system 1212 includes, for example, a kernel 1224, services 1226, and drivers 1228. The kernel 1224 acts as an abstraction layer between the hardware and the other software layers. For example, the kernel 1224 provides memory management, processor management (e.g., scheduling), component management, networking, and security settings, among other functionalities. The services 1226 can provide other common services for the other software layers. The drivers 1228 are responsible for controlling or interfacing with the underlying hardware. For instance, the drivers 1228 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1214 provide a common low-level infrastructure used by the applications 1218. The libraries 1214 can include system libraries 1230 (e.g., C standard library) that provide functions such as memory allocation functions, string manipulation functions, mathematic functions, and the like. In addition, the libraries 1214 can include API libraries 1232 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1214 can also include a wide variety of other libraries 1234 to provide many other APIs to the applications 1218.

The frameworks 1216 provide a common high-level infrastructure that is used by the applications 1218. For example, the frameworks 1216 provide various graphical user interface (GUI) functions, high-level resource management, and high-level location services. The frameworks 1216 can provide a broad spectrum of other APIs that can be used by the applications 1218, some of which may be specific to a particular operating system or platform.

In an example, the applications 1218 may include a home application 1236, a location application 1238, and a broad assortment of other applications such as a third-party application 1240. The applications 1218 are programs that execute functions defined in the programs. Various programming languages can be employed to create one or more of the applications 1218, structured in a variety of manners, such as object-oriented programming languages (e.g., Objective-C, Java, or C++) or procedural programming languages (e.g., C or assembly language). In a specific example, the third-party application 1240 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1240 can invoke the API calls 1220 provided by the operating system 1212 to facilitate functionalities described herein.

FIG. 13 shows steps of an example method 1300 of controlling adjustable DOEs of a waveguide as described above.

At operation 1302, light is propagated within a waveguide body 142 in one or more directions (e.g., direction 140, or directions 430, 432) substantially tangential to an output surface 138 of the waveguide body 142.

In operation 1304, method 1300 provides a respective stimulus to each of one or more diffractive optical elements (DOEs) independently. Each DOE is configured to change its diffraction efficiency in response to the respective stimulus, such that at least a portion of the light propagating in the waveguide body 142 is diffracted by the one or more DOEs.

Conclusion

As described above, examples described herein may address one or more technical problems associated with diffractive waveguides. Efficiency of an image projection system may be increased. The intensity of light projected toward the user's eye may be increased. The optical power needs of such a projection system may be decreased. Stray light may be reduced, thereby improving image quality. Light loss, ghosting, and/or stray lighting effects caused by color-specific DOEs may be reduced. The brightness of ambient stray light artifacts (e.g., rainbow effects) may be reduced. The need for air gaps inserted in between each adjacent pair of stacked colors-specific DOEs may be eliminated.

Thus, in accordance with the examples described herein, a waveguide, method, and computer-readable medium may be provided.

Example 1 is a waveguide, comprising: a waveguide body comprising an optically transmissive material having a refractive index different from a surrounding medium and defining an output surface, configured to propagate light by total internal reflection in one or more directions substantially tangential to the output surface; one or more diffractive optical elements (DOEs), each configured to change its diffraction efficiency in response to a respective stimulus; and a DOE driver configured to provide the respective stimuli to each of the DOEs independently.

In Example 2, the subject matter of Example 1 includes, wherein: the stimuli provided to the DOEs are configured to direct the light toward a target region by diffracting the light out of the waveguide body via the output surface.

In Example 3, the subject matter of Example 2 includes, wherein: the one or more DOEs comprise: a first one or more output DOEs configured to diffract light out of the output surface toward the target region; and a second one or more output DOEs configured to diffract light out of the output surface toward a location outside of the target region; and the stimuli provided to the DOEs are configured to increase the diffraction efficiency of the first one or more output DOEs relative to the diffraction efficiency of the second one or more output DOEs.

In Example 4, the subject matter of Example 3 includes, wherein increasing the diffraction efficiency of the first one or more output DOEs relative to the diffraction efficiency of the second one or more output DOEs comprises: increasing the diffraction efficiency of the first one or more output DOEs.

In Example 5, the subject matter of Examples 3-4 includes, wherein increasing the diffraction efficiency of the first one or more output DOEs relative to the diffraction efficiency of the second one or more output DOEs comprises: decreasing the diffraction efficiency of the second one or more output DOEs.

In Example 6, the subject matter of Examples 3-5 includes, a controller configured to: receive target region data; and control the DOE driver to provide the stimuli based on the target region data.

In Example 7, the subject matter of Example 6 includes, wherein: the target region comprises a location of an eye; and the target region data comprises eye tracking data representative of the location of the eye.

In Example 8, the subject matter of Examples 2-7 includes, wherein: the one or more DOEs comprise: a fold DOE configured to diffract light propagating in a first direction of the one or more directions to propagate in a second direction of the one or more directions; the light propagating in the second direction is more likely to reach the target region than the light propagating in the first direction; and the stimuli provided to the DOEs are configured to increase the diffraction efficiency of the fold DOE such that an amount of light diffracted to propagate in the second direction is increased.

In Example 9, the subject matter of Examples 1-8 includes, wherein: the stimuli provided to the DOEs are configured to selectively propagate light according to time-varying conditions.

In Example 10, the subject matter of Example 9 includes, wherein: the time-varying conditions comprise a temporal sequence of color-specific periods comprising: a first period in which light of a first color propagates within the waveguide body; and a second period in which light of a second color propagates within the waveguide body; the one or more DOEs comprise: a first one or more DOEs configured to diffract light of the first color; and a second one or more DOEs configured to diffract light of the second color; and the stimuli are configured to: increase the diffraction efficiency of the first one or more DOEs relative to the diffraction efficiency of the second one or more DOEs during the first period; and increase the diffraction efficiency of the second one or more DOEs relative to the diffraction efficiency of the first one or more DOEs during the second period.

In Example 11, the subject matter of Example 10 includes, wherein: the first one or more DOEs comprise a first one or more output DOEs configured to diffract light of the first color out of the output surface; the second one or more DOEs comprise a second one or more output DOEs configured to diffract light of the second color out of the output surface; and the first one or more output DOEs and the second one or more output DOEs are arranged in a stacked configuration such that: during the first period, relatively more light enters the first one or more output DOEs and is diffracted out of the output surface by the first one or more output DOEs; and during the second period, relatively more light passes through the first one or more output DOEs, enters the second one or more output DOEs, and is diffracted out of the output surface by the second one or more output DOEs.

In Example 12, the subject matter of Example 11 includes, wherein: the first one or more DOEs further comprise a first one or more input DOEs configured to diffract light of the first color into the waveguide body at an angle sufficient to achieve the total internal reflection; the second one or more DOEs further comprise a second one or more input DOEs configured to diffract light of the second color into the waveguide body at an angle sufficient to achieve the total internal reflection; and the first one or more input DOEs and the second one or more input DOEs are arranged in a stacked configuration such that: during the first period, relatively more light enters the first one or more input DOEs and is diffracted into the waveguide body by the first one or more input DOEs; and during the second period, relatively more light passes through the first one or more input DOEs, enters the second one or more input DOEs, and is diffracted into the waveguide body by the second one or more output DOEs.

In Example 13, the subject matter of Example 12 includes, wherein: the stacked arrangements do not include air gaps between the first one or more output DOEs and the second one or more output DOEs, or between the first one or more input DOEs and the second one or more input DOEs.

In Example 14, the subject matter of Examples 1-13 includes, wherein: the stimuli comprise a physical deformation of at least one DOE.

In Example 15, the subject matter of Examples 1-14 includes, wherein: the stimuli comprise a change in temperature of at least one DOE.

In Example 16, the subject matter of Examples 1-15 includes, wherein: the stimuli comprise electrical stimulation of at least one DOE.

In Example 17, the subject matter of Example 16 includes, wherein: the at least one DOE comprises a liquid crystal material.

In Example 18, the subject matter of Examples 1-17 includes, wherein: the optically transmissive material comprises a dielectric material.

In Example 19, the subject matter of Examples 1-18 includes, wherein: the optically transmissive material comprises a plastic material.

In Example 20, the subject matter of Examples 1-19 includes, wherein: the optically transmissive material comprises a glass material.

Example 21 is a method comprising: propagating light within a waveguide body in one or more directions substantially tangential to an output surface of the waveguide body; and providing a respective stimulus to each of one or more diffractive optical elements (DOEs) independently, each DOE being configured to change its diffraction efficiency in response to the respective stimulus, such that at least a portion of the light propagating in the waveguide body is diffracted by the one or more DOEs.

Example 22 is a non-transitory computer-readable storage medium, the computer-readable storage medium including instructions that, when executed by a computer, cause the computer to perform operations including: providing a respective stimulus to each of one or more diffractive optical elements (DOEs) independently, each DOE being configured to change its diffraction efficiency in response to the respective stimulus, such that at least a portion of the light propagating in a waveguide body is diffracted by the one or more DOEs.

Example 23 is at least one machine-readable medium including instructions that, when executed by processing circuitry, cause the processing circuitry to perform operations to implement of any of Examples 1-22.

Example 24 is an apparatus comprising means to implement of any of Examples 1-22.

Example 25 is a system to implement of any of Examples 1-22.

Example 26 is a method to implement of any of Examples 1-22.

It will be appreciated that the various aspects of the examples described above may be combined in various combination or sub-combinations.

Glossary

"Augmented reality" (AR) refers, for example, to an interactive experience of a real-world environment where physical objects that reside in the real-world are "augmented" or enhanced by computer-generated digital content (also referred to as virtual content or synthetic content). AR can also refer to a system that enables a combination of real and virtual worlds, real-time interaction, and 3D registration of virtual and real objects. A user of an AR system perceives virtual content that appear to be attached or interact with a real-world physical object.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein.

As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Programming Interface (API)). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; USB flash drives; and CD-ROM and DVD-ROM disks. The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action, or an interaction with other users or computer systems.

What is claimed is:

1. A waveguide, comprising:
- a waveguide body comprising an optically transmissive material having a refractive index different from a surrounding medium and defining an output surface, configured to propagate light by total internal reflection in one or more directions substantially tangential to the output surface;
- one or more diffractive optical elements (DOEs), each configured to change its diffraction efficiency in response to a respective stimulus;
- a DOE driver configured to provide the respective stimuli to each of the DOEs independently; and
- a controller configured to:
  - receive eye tracking data representative of a location of an eye; and
  - dynamically control the DOE driver to provide the stimuli based on the eye tracking data to direct the light toward the location of the eye by diffracting the light out of the waveguide body via the output surface.

2. The waveguide of claim 1, wherein:
- the one or more DOEs comprise:
  - a first one or more output DOEs configured to diffract light out of the output surface toward the target region; and
  - a second one or more output DOEs configured to diffract light out of the output surface toward a location outside of the target region; and the stimuli provided to the DOEs are configured to increase the diffraction efficiency of the first one or more output DOEs relative to the diffraction efficiency of the second one or more output DOEs.

3. The waveguide of claim 2, wherein increasing the diffraction efficiency of the first one or more output DOEs relative to the diffraction efficiency of the second one or more output DOEs comprises:

increasing the diffraction efficiency of the first one or more output DOEs.

4. The waveguide of claim 2, wherein increasing the diffraction efficiency of the first one or more output DOEs relative to the diffraction efficiency of the second one or more output DOEs comprises:

decreasing the diffraction efficiency of the second one or more output DOEs.

5. The waveguide of claim 4, wherein:

the one or more DOEs comprise:

a fold DOE configured to diffract light propagating in a first direction of the one or more directions to propagate in a second direction of the one or more directions;

the light propagating in the second direction is more likely to reach the target region than the light propagating in the first direction; and the stimuli provided to the DOEs are configured to increase the diffraction efficiency of the fold DOE such that an amount of light diffracted to propagate in the second direction is increased.

6. The waveguide of claim 1, wherein:

the stimuli provided to the DOEs are configured to selectively propagate light according to time-varying conditions.

7. The waveguide of claim 6, wherein:

the time-varying conditions comprise a temporal sequence of color-specific periods comprising:

a first period in which light of a first color propagates within the waveguide body; and a second period in which light of a second color propagates within the waveguide body;

the one or more DOEs comprise:

a first one or more DOEs configured to diffract light of the first color; and a second one or more DOEs configured to diffract light of the second color; and the stimuli are configured to:

increase the diffraction efficiency of the first one or more DOEs relative to the diffraction efficiency of the second one or more DOEs during the first period; and increase the diffraction efficiency of the second one or more DOEs relative to the diffraction efficiency of the first one or more DOEs during the second period.

8. The waveguide of claim 7, wherein:

the first one or more DOEs comprise a first one or more output DOEs configured to diffract light of the first color out of the output surface;

the second one or more DOEs comprise a second one or more output DOEs configured to diffract light of the second color out of the output surface; and the first one or more output DOEs and the second one or more output DOEs are arranged in a stacked configuration such that:

during the first period, relatively more light enters the first one or more output DOEs and is diffracted out of the output surface by the first one or more output DOEs; and during the second period, relatively more light passes through the first one or more output DOEs, enters the second one or more output DOEs, and is diffracted out of the output surface by the second one or more output DOEs.

9. The waveguide of claim 8, wherein:

the first one or more DOEs further comprise a first one or more input DOEs configured to diffract light of the first color into the waveguide body at an angle sufficient to achieve the total internal reflection;

the second one or more DOEs further comprise a second one or more input DOEs configured to diffract light of the second color into the waveguide body at an angle sufficient to achieve the total internal reflection; and the first one or more input DOEs and the second one or more input DOEs are arranged in a stacked configuration such that:

during the first period, relatively more light enters the first one or more input DOEs and is diffracted into the waveguide body by the first one or more input DOEs; and during the second period, relatively more light passes through the first one or more input DOEs, enters the second one or more input DOEs, and is diffracted into the waveguide body by the second one or more output DOEs.

10. The waveguide of claim 9, wherein:

the stacked arrangements do not include air gaps between the first one or more output DOEs and the second one or more output DOEs, or between the first one or more input DOEs and the second one or more input DOEs.

11. The waveguide of claim 1, wherein:

the stimuli comprise a physical deformation of at least one DOE.

12. The waveguide of claim 1, wherein:

the stimuli comprise a change in temperature of at least one DOE.

13. The waveguide of claim 1, wherein:

the stimuli comprise electrical stimulation of at least one DOE.

14. The waveguide of claim 13, wherein:

the at least one DOE comprises a liquid crystal material.

15. The waveguide of claim 1, wherein:

the optically transmissive material comprises a dielectric material.

16. The waveguide of claim 1, wherein:

the optically transmissive material comprises a plastic material.

17. The waveguide of claim 1, wherein:

the optically transmissive material comprises a glass material.

18. A method comprising:

propagating light within a waveguide body in one or more directions substantially tangential to an output surface of the waveguide body;

receiving eye tracking data representative of a location of an eye; and dynamically providing a respective stimulus to each of one or more diffractive optical elements (DOEs) independently based on the eye tracking data, each DOE being configured to change its diffraction efficiency in response to the respective stimulus, such that at least a portion of the light propagating in the waveguide body is diffracted by the one or more DOEs to direct the light toward the location of the eye by diffracting the light out of the waveguide body via the output surface.

19. A non-transitory computer-readable storage medium, the computer-readable storage medium including instructions that, when executed by a computer, cause the computer to perform operations including:

receiving eye tracking data representative of a location of an eye; and dynamically providing a respective stimulus to each of one or more diffractive optical elements (DOEs) independently based on the eye tracking data, each DOE being configured to change its diffraction efficiency in response to the respective stimulus, such that at least a portion of the light propagating in a waveguide body is diffracted by the one or more DOEs to direct the light toward the location of the eye by diffracting the light out of the waveguide body via the output surface.

* * * * *